US008593040B2

(12) United States Patent
Dudik et al.

(10) Patent No.: US 8,593,040 B2
(45) Date of Patent: Nov. 26, 2013

(54) LED LAMP WITH SURFACE AREA ENHANCING FINS

(75) Inventors: David C. Dudik, South Euclid, OH (US); Joshua I. Rintamaki, Westlake, OH (US); Gary R. Allen, Chesterland, OH (US); Glenn H. Kuenzler, Beachwood, OH (US)

(73) Assignee: GE Lighting Solutions LLC, Cleveland, OH (US)

( * ) Notice: Subject to any disclaimer, the term of this patent is extended or adjusted under 35 U.S.C. 154(b) by 629 days.

(21) Appl. No.: 12/572,480

(22) Filed: Oct. 2, 2009

(65) Prior Publication Data

US 2011/0080096 A1 Apr. 7, 2011

(51) Int. Cl.
*H01J 1/02* (2006.01)
*B60Q 1/00* (2006.01)

(52) U.S. Cl.
USPC .............................................. 313/46; 362/547

(58) Field of Classification Search
None
See application file for complete search history.

(56) References Cited

U.S. PATENT DOCUMENTS 5,217,600 A * 6/1993 Le et al. ........................ 205/328
6,227,679 B1 5/2001 Zhang et al.
6,305,821 B1 10/2001 Hsieh et al.
7,086,756 B2 8/2006 Maxik
D538,950 S 3/2007 Maxik
D538,951 S 3/2007 Maxik
7,588,351 B2 * 9/2009 Meyer ........................... 362/294
2004/0228131 A1 11/2004 Minano et al.
2005/0116597 A1 6/2005 Hsu
2005/0127543 A1 6/2005 Ricking et al.
2005/0174769 A1 8/2005 Yong et al.
2006/0005947 A1 1/2006 Arik et al.
2006/0034077 A1 2/2006 Chang
2006/0092640 A1 5/2006 Li
2006/0227558 A1 * 10/2006 Osawa et al. ................ 362/351
2007/0236912 A1 10/2007 Porchia et al.
2007/0267976 A1 11/2007 Bohler et al.
2008/0080166 A1 4/2008 Duong
2008/0278955 A1 11/2008 Boyer
2009/0129102 A1 5/2009 Xiao et al.
2009/0135595 A1 5/2009 Chen
2009/0174302 A1 7/2009 Davey et al.
2009/0175041 A1 * 7/2009 Yuen et al. .................... 362/294
2009/0195186 A1 8/2009 Guest et al.
2010/0195335 A1 8/2010 Allen et al.

FOREIGN PATENT DOCUMENTS

DE 10 2007 037820 2/2009
GB 2366610 3/2002
JP 2004-186109 A2 7/2004
WO WO 2007/130357 11/2007
WO WO 2009/128004 10/2009

OTHER PUBLICATIONS

US Department of Energy, "Bright Tomorrow Lighting Competition," Revision 1, at http://www.lightingprize.org.pdfs/LPrize-Revision1.pdf, Jun. 26, 2009.

(Continued)

*Primary Examiner* — Britt D Hanley
(74) *Attorney, Agent, or Firm* — Fay Sharpe LLP

(57) ABSTRACT

A light emitting apparatus comprising an at least substantially omnidirectional light assembly including an LED-based light source within a light-transmissive envelope. Electronics configured to drive the LED-based light source, the electronics being disposed within a base having a blocking angle no larger than 45°. A plurality of heat dissipation elements (such as fins) in thermal communication with the base and extending adjacent the envelope.

35 Claims, 22 Drawing Sheets

(56) References Cited

OTHER PUBLICATIONS

US Department of Energy, "Energy Star Program Requirements for Intergral LED Lamps," Draft 2, at www.energystar.gov/.../integral_leds/Draft_2_ENERGY_STAR_LED_Integral_Lamp_Specification.pdf., May 19, 2009.
US Department of Energy, "Energy Star Program Requirements for Integral LED Lamps, Eligibility Criteria," Third Draft, Sep. 18, 2009.
CAO Group, Inc., "Dynasty Light Redefined," Onesolution, at http://www.caogroup.com/(S(Ib510f45dojgv045obhfxguh))/PDF/OPTO/Dynasty_S14_Brochure.pdf, Sep. 25, 2008.
OSRAM, "OSRAM LEDs: give your home a bright new look,", at http://www.olafsson.is/resources/Files/Olafsson_is/OSRAM-pdf/led_baeklingur.pdf, last visited Dec. 16, 2009.
International Search Report from PCT/US2010/051043, Dec. 27, 2010.

* cited by examiner

18a.

18b.

22a. 22b. 22c. 22d.

LED LAMP WITH SURFACE AREA ENHANCING FINS

BACKGROUND

The following relates to the illumination arts, lighting arts, solid-state lighting arts, and related arts.

Incandescent and halogen lamps are conventionally used as both omni-directional and directional light sources. Omni-directional lamps are intended to provide substantially uniform intensity distribution versus angle in the far field, greater than 1 meter away from the lamp, and find diverse applications such as in desk lamps, table lamps, decorative lamps, chandeliers, ceiling fixtures, and other applications where a uniform distribution of light in all directions is desired.

With reference to FIG. 1, a coordinate system is described which is used herein to describe the spatial distribution of illumination generated by an incandescent lamp or, more generally, by any lamp intended to produce omnidirectional illumination. The coordinate system is of the spherical coordinate system type, and is shown with reference to an incandescent A-19 style lamp L. For the purpose of describing the far field illumination distribution, the lamp L can be considered to be located at a point L0, which may for example coincide with the location of the incandescent filament. Adapting spherical coordinate notation conventionally employed in the geographic arts, a direction of illumination can be described by an elevation or latitude coordinate and an azimuth or longitude coordinate. However, in a deviation from the geographic arts convention, the elevation or latitude coordinate used herein employs a range [0°, 180°] where: θ=0° corresponds to "geographic north" or "N". This is convenient because it allows illumination along the direction θ=0° to correspond to forward-directed light. The north direction, that is, the direction θ=0°, is also referred to herein as the optical axis. Using this notation, θ=180° corresponds to "geographic south" or "S" or, in the illumination context, to backward-directed light. The elevation or latitude θ=90° corresponds to the "geographic equator" or, in the illumination context, to sideways-directed light.

With continuing reference to FIG. 1, for any given elevation or latitude an azimuth or longitude coordinate ϕ can also be defined, which is everywhere orthogonal to the elevation or latitude θ. The azimuth or longitude coordinate θ has a range [0°, 360°], in accordance with geographic notation.

It will be appreciated that at precisely north or south, that is, at θ=0° or at θ=180° (in other words, along the optical axis), the azimuth or longitude coordinate has no meaning, or, perhaps more precisely, can be considered degenerate. Another "special" coordinate is θ=90° which defines the plane transverse to the optical axis which contains the light source (or, more precisely, contains the nominal position of the light source for far field calculations, for example the point L0).

In practice, achieving uniform light intensity across the entire longitudinal span ϕ=[0°, 360°] is typically not difficult, because it is straightforward to construct a light source with rotational symmetry about the optical axis (that is, about the axis θ=0°. For example, the incandescent lamp L suitably employs an incandescent filament located at coordinate center L0 which can be designed to emit substantially omnidirectional light, thus providing a uniform intensity distribution respective to the azimuth θ for any latitude.

However, achieving ideal omnidirectional intensity respective to the elevational or latitude coordinate is generally not practical. For example, the lamp L is constructed to fit into a standard "Edison base" lamp fixture, and toward this end the incandescent lamp L includes a threaded Edison base EB, which may for example be an E25, E26, or E27 lamp base where the numeral denotes the outer diameter of the screw turns on the base EB, in millimeters. The Edison base EB (or, more generally, any power input system located "behind" the light source) lies on the optical axis "behind" the light source position L0, and hence blocks backward emitted light (that is, blocks illumination along the south latitude, that is, along θ=180°), and so the incandescent lamp L cannot provide ideal omnidirectional light respective to the latitude coordinate.

Commercial incandescent lamps, such as 60 W Soft White incandescent lamps (General Electric, New York, USA) are readily constructed which provide intensity across the latitude span θ=[0°, 135°] which is uniform to within ±20% (area D) of the average intensity (line C) over that latitude range as shown in FIG. 2. Plot A shows the intensity distribution for an incandescent lamp with a filament aligned horizontally to the optical axis, and plot B shows the intensity distribution for an incandescent lamp with a filament aligned with the optical axis. This is generally considered an acceptable intensity distribution uniformity for an omnidirectional lamp, although there is some interest in extending this uniformity span still further, such as to a latitude span of θ=[0°, 150°] with ±10% uniformity. These uniformity spans would be effective in meeting current and pending regulations on LED lamps such as U.S. DoE Energy Star Draft 2, and U.S. DoE Lighting Prize.

By comparison with incandescent and halogen lamps, solid-state lighting technologies such as light emitting diode (LED) devices are highly directional by nature, as they are a flat device emitting from only one side. For example, an LED device, with or without encapsulation, typically emits in a directional Lambertian spatial intensity distribution having intensity that varies with cos(θ) in the range θ=[0°, 90°] and has zero intensity for θ>90°. A semiconductor laser is even more directional by nature, and indeed emits a distribution describable as essentially a beam of forward-directed light limited to a narrow cone around θ=0°.

Another challenge associated with solid-state lighting is that unlike an incandescent filament, an LED chip or other solid-state lighting device typically cannot be operated efficiently using standard 110V or 220V a.c. power. Rather, on-board electronics are typically provided to convert the a.c. input power to d.c. power of lower voltage amenable for driving the LED chips. As an alternative, a series string of LED chips of sufficient number can be directly operated at 110V or 220V, and parallel arrangements of such strings with suitable polarity control (e.g., Zener diodes) can be operated at 110V or 220V a.c. power, albeit at substantially reduced power efficiency. In either case, the electronics constitute additional components of the lamp base as compared with the simple Edison base used in integral incandescent or halogen lamps.

Yet another challenge in solid-state lighting is the need for heat sinking. LED devices are highly temperature-sensitive in both performance and reliability as compared with incandescent or halogen filaments. This is addressed by placing a mass of heat sinking material (that is, a heat sink) contacting or otherwise in good thermal contact with the LED device. The space occupied by the heat sink blocks emitted light and hence further limits the ability to generate an omnidirectional LED-based lamp. This limitation is enhanced when a LED lamp is constrained to the physical size of current regulatory limits (ANSI, NEMA, etc.) that define maximum dimensions for all lamp components, including light sources, electronics, optical elements, and thermal management.

The combination of electronics and heat sinking results in a large base that blocks "backward" illumination, which has heretofore substantially limited the ability to generate omni-directional illumination using an LED replacement lamp. The heat sink in particular preferably has a large volume and also large surface area in order to dissipate heat away from the lamp by a combination of convection and radiation.

Currently, the majority of commercially available LED lamps intended as incandescent replacements do not provide a uniform intensity distribution that is similar to incandescent lamps. For example, a hemispherical element may be placed over an LED light source. The resultant intensity distribution is mainly upward going, with little light emitted below the equator. Clearly, this does not provide an intensity distribution, which satisfactorily emulates an incandescent lamp.

BRIEF SUMMARY

Embodiments are disclosed herein as illustrative examples. In one, the light emitting apparatus comprises a light transmissive envelope surrounding an LED light source. The light source is in thermal communication with a heat sinking base element. A plurality of surface area enhancing elements are in thermal communication with the base element and extend in a direction such that the elements are adjacent to the light-emitting envelope. Properly designed surface area enhancing elements will provide adequate thermal dissipation while not significantly disturbing the light intensity distribution from the LED light source.

According to another embodiment, a light emitting apparatus including a light emitting diode light source is provided. The light emitting diode is in thermal communication with a base element. The base element has a light blocking angle of between 15° and 45°. A plurality of surface area enhancing elements are located in thermal communication with the base element and increase the thermal dissipation capacity of apparatus by a factor of 4× and absorb less than 10% of an emitted light flux.

In another embodiment, a light emitting device comprises a plurality of light emitting diodes mounted to a metal core printed circuit board (MCPCB) and receive electrical power therefrom. A heat sink having a first cylindrical section and a second truncated cone section is provided and the MCPCB is in thermal communication with the truncated cone section of the heat sink. An Edison screw base is provided adjacent the cylindrical section of the heat sink. An electrical connection is provided between the screw base, any required electronics contained in the cylindrical section, and the MCPCB. A light diffusing envelope extends from the truncated cone section of the heat sink and encompasses the light emitting diodes. Preferably, at least four heat dissipating fins are in thermal communication with the heat sink and extend therefrom adjacent the envelope. The fins have a first relatively thin section adjacent the heat sink, a second relatively thin section adjacent the envelope remote from the heat sink and a relatively thicker intermediate section. Advantageously, the device is dimensioned to satisfy the requirements of ANSI C78.20-2003.

BRIEF DESCRIPTION OF THE DRAWINGS

The invention may take form in various components and arrangements of components, and in various process operations and arrangements of process operations. The drawings are only for purposes of illustrating embodiments and are not to be construed as limiting the invention.

DETAILED DESCRIPTION OF PREFERRED EMBODIMENTS

The performance of an LED replacement lamp can be quantified by its useful lifetime, as determined by its lumen maintenance and its reliability over time. Whereas incandescent and halogen lamps typically have lifetimes in the range ~1000 to 5000 hours, LED lamps are capable of >25,000 hours, and perhaps as much as 100,000 hours or more.

The temperature of the p-n junction in the semiconductor material from which the photons are generated is a significant factor in determining the lifetime of an LED lamp. Long lamp life is achieved at junction temperatures of about 100° C. or less, while severely shorter life occurs at about 150° C. or more, with a gradation of lifetime at intermediate temperatures. The power density dissipated in the semiconductor material of a typical high-brightness LED circa year 2009 (~1 Watt, ~50-100 lumens, ~1×1 mm square) is about 100 Watt/$cm^2$. By comparison, the power dissipated in the ceramic envelope of a ceramic metal-halide (CMH) arctube is typically about 20-40 $W/cm^2$. Whereas, the ceramic in a CMH lamp is operated at about 1200-1400 K at its hottest spot, the semiconductor material of the LED device should be operated at about 400 K or less, in spite of having more than 2× higher power density than the CMH lamp. The temperature differential between the hot spot in the lamp and the ambient into which the power must be dissipated is about 1000 K in the case of the CMH, but only about 100 K for the LED lamp. Accordingly, the thermal management must be on the order of ten times more effective for LED lamps than for typical HID lamps.

In designing the heat sink, the limiting thermal impedance in a passively cooled thermal circuit is typically the convective impedance to ambient air (that is, dissipation of heat into the ambient air). This convective impedance is generally proportional to the surface area of the heat sink. In the case of a replacement lamp application, where the LED lamp must fit into the same space as the traditional Edison-type incandescent lamp being replaced, there is a fixed limit on the available amount of surface area exposed to ambient air. Therefore, it is advantageous to use as much of this available surface area as possible for heat dissipation into the ambient, such as placing heat fins or other heat dissipating structures around or adjacent to the light source.

Figure 3:
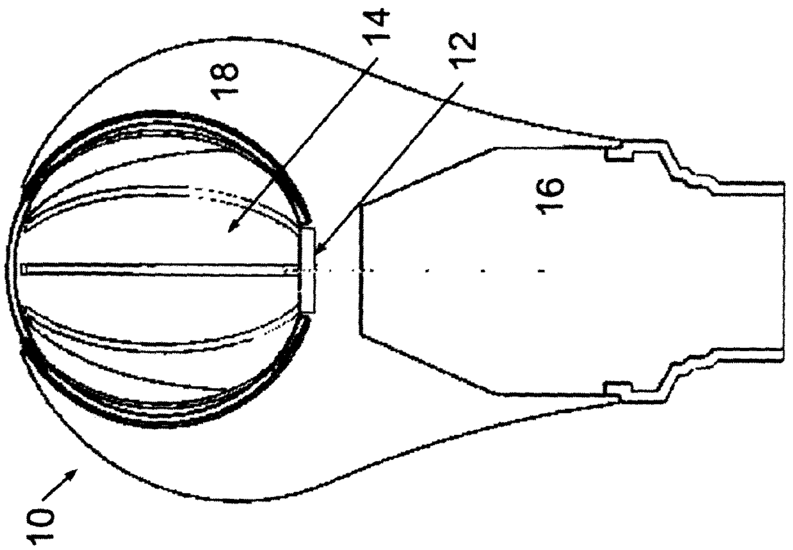
FIG. 3 diagrammatically shows the lamp of the present invention.
Figure 1:
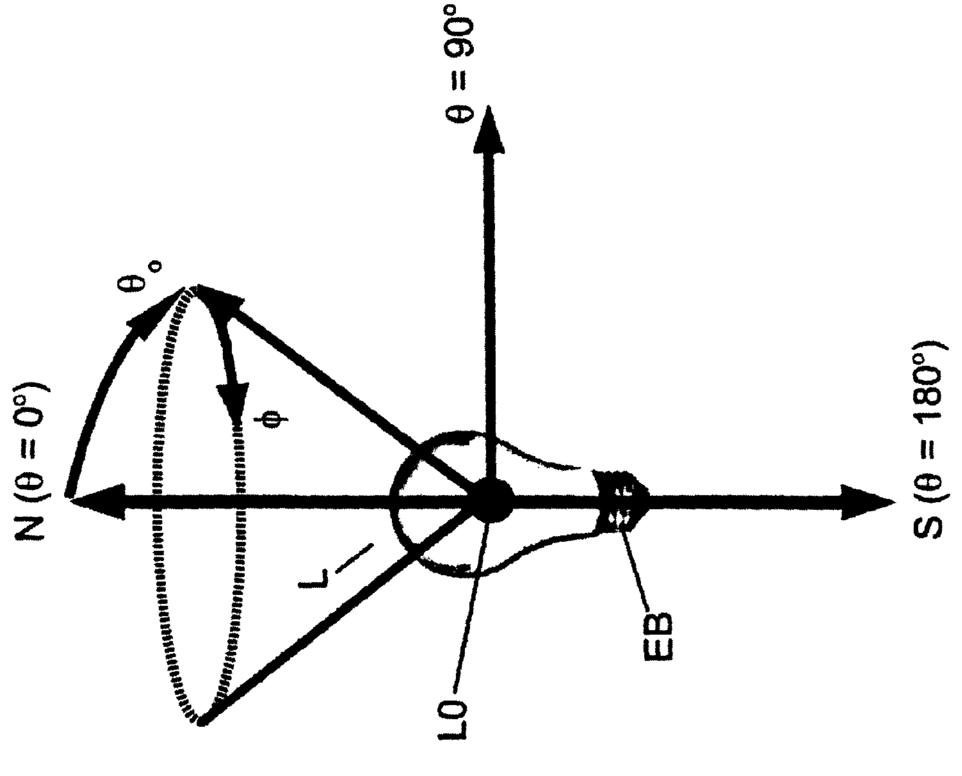
FIG. 1 diagrammatically shows, with reference to a conventional incandescent light bulb, a coordinate system that is used herein to describe illumination distributions.

The present embodiment is directed to an integral replacement LED lamp, where the input to the lamp is the main electrical supply, and the output is the desired intensity pattern, preferably with no ancillary electronic or optical components external to the lamp. With reference to FIG. 3, an LED-based lamp 10 includes an LED-based Lambertian light source 12 and a light-transmissive spherical envelope 14. However, it is noted that "spherical" is used herein to describe a generally spherical shape. Furthermore, it is noted that other shapes will provide a similarly useful intensity distribution. Moreover, deviations from spherical are encompassed within this description and in fact, may be preferred in certain embodiments to improve the interaction between diffuser and heat sink. The illustrated light-transmissive spherical envelope 14 preferably has a surface that diffuses light. In some embodiments, the spherical envelope 14 is a glass element, although a diffuser of another light-transmissive material such as plastic or ceramic is also contemplated. The envelope 14 may be inherently light-diffusive, or can be made light-diffusive in various ways, such as: frosting or other texturing to promote light diffusion; coating with a light-diffusive coating such as a Soft-White diffusive coating (available from General Electric Company, New York, USA) of a type used as a light-diffusive coating on the glass bulbs of some incandescent light bulbs; embedding light-scattering particles in the glass, plastic, or other material of the envelope; various combinations thereof; or so forth. However, it is noted that it is also within the scope of the present invention that the envelope be essentially non-diffuse. Moreover, this design parameter is feasible if another light scattering mechanism is employed internal to the envelope.

The envelope 14 optionally may also include a phosphor, for example coated on the envelope surface, to convert the light from the LEDs to another color, for example to convert blue or ultraviolet (UV) light from the LEDs to white light. In some such embodiments, it is contemplated for the phosphor to be the sole component of the diffuser 14. In such embodiments, the phosphor could be a diffusing phosphor. In other contemplated embodiments, the diffuser includes a phosphor plus an additional diffusive element such as frosting, enamel paint, a coating, or so forth, as described above. Alternative, the phosphor can be associated with the LED package.

The LED-based Lambertian light source 12 comprises at least one light emitting diode (LED) device, which in the illustrated embodiment includes a plurality of devices having respective spectra and intensities that mix to render white light of a desired color temperature and CRI. For example, in some embodiments the first LED devices output light having a greenish rendition (achievable, for example, by using a blue- or violet-emitting LED chip that is coated with a suitable "white" phosphor) and the second LED devices output red light (achievable, for example, using a GaAsP or AlGaInP or other epitaxy LED chip that naturally emits red light), and the light from the first and second LED devices blend together to produce improved white rendition. On the other hand, it is also contemplated for the planar LED-based Lambertian light source to comprise a single LED device, which may be a white LED device or a saturated color LED device or so forth. Laser LED devices are also contemplated for incorporation into the lamp.

In one preferred embodiment, the light-transmissive spherical envelope 14 includes an opening sized to receive or mate with the LED-based Lambertian light source 12 such that the light-emissive principle surface of the LED-based Lambertian light source 12 faces into the interior of the spherical envelope 14 and emits light into the interior of the spherical envelope 14. The spherical envelope is large compared with the area of the LED-based Lambertian light source 12. The LED-based Lambertian light source 12 is mounted at or in the opening with its light-emissive surface arranged approximately tangential to the curved surface of the spherical envelope 14.

The LED-based Lambertian light source 12 is mounted to a base 16 which provides heat sinking and space to accommodate electronics. The LED devices are mounted in a planar orientation on a circuit board, which is optionally a metal core printed circuit board (MCPCB). The base element 16 provides support for the LED devices and is thermally conductive (heat sinking). To provide sufficient heat dissipation, the base 16 is in thermal communication with a plurality of thermally conductive fins 18. The fins 18 extend toward the north pole of the lamp ø=0°, adjacent the spherical envelope 14. The fins 18 can be constructed of any thermally conductive material, ones with high thermal conductivity being preferred, easily manufacturable metals or appropriate moldable plastics being more preferred, and cast or aluminum or copper being particularly preferred. Advantageously, it can be seen that the design provides an LED based light source that fits within the ANSI outline for an A-19 incandescent bulb (ANSI C78.20-2003).

Figure 5:
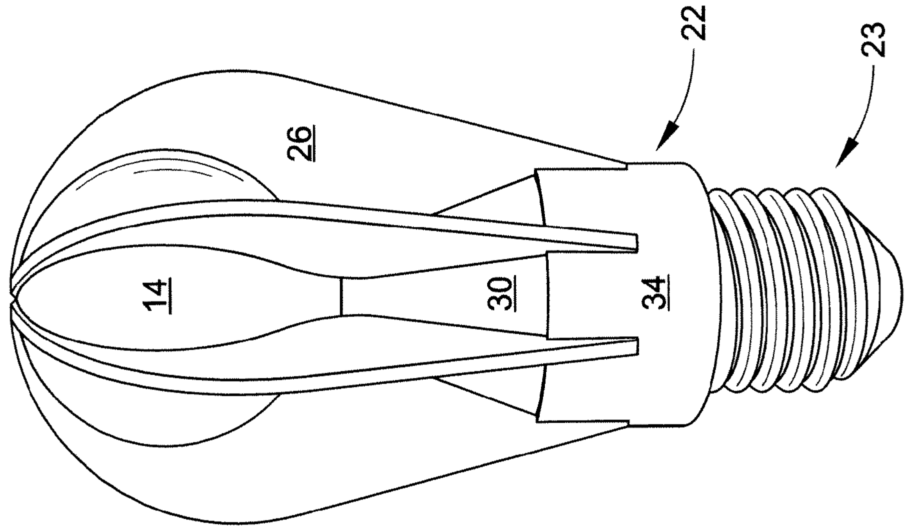
FIG. 5 is a side elevation view of an alternative diffuse heat sinking omnidirectional LED-based lamp.
Figure 4:
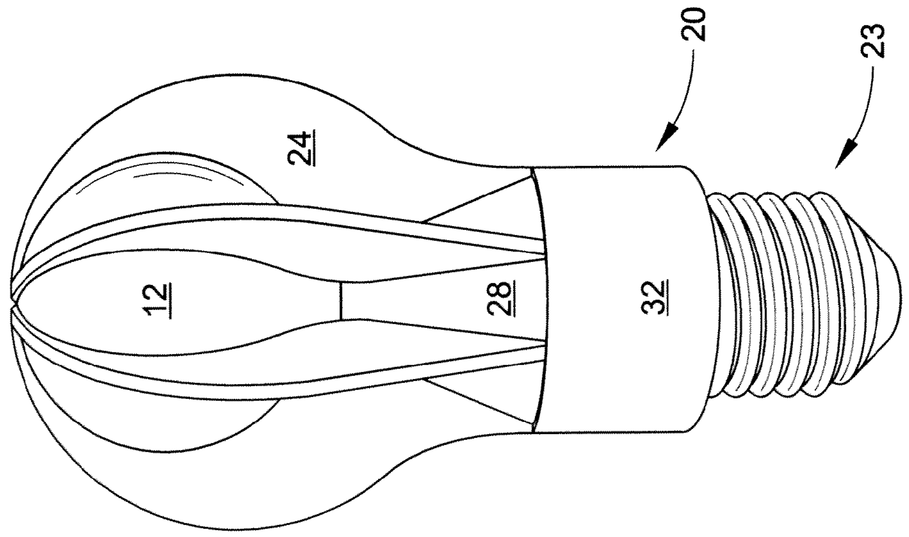
FIG. 4 is a side elevation view of an omnidirectional LED-based lamp employing a planar LED-based Lambertian light source and a spherical envelope, and peripheral finned high specularity heat sinking.

Referring now to FIGS. 4-5, an electronic driver is contained in lamp bases 20, 22, with the balance of each base (that is, the portion of each base not occupied by the respective electronics) being made of a heat-sinking material. The electronic driver is sufficient, by itself, to convert the AC power received at the Edison base 23 (for example, 110 volt AC of the type conventionally available at Edison-type lamp sockets in U.S. residential and office locales, or 220 volt AC of the type conventionally available at Edison-type lamp sockets in European residential and office locales) to a form suitable format to drive the LED-based light source. (It is also contemplated to employ another type of electrical connector, such as a bayonet mount of the type sometimes used for incandescent light bulbs in Europe).

The lamps further include extensions comprising fins 24 and 26 that extend over a portion of the spherical envelope 14 to further enhance radiation and convection of heat generated by the LED chips to the ambient environment. Although the fins of FIGS. 4 and 5 are similar, they demonstrate how various designs can accomplish the desired results. Moreover, fins 26 are slightly more elongated than fins 24 and extend deeper into the base 22 and 20, respectively.

Figure 6:
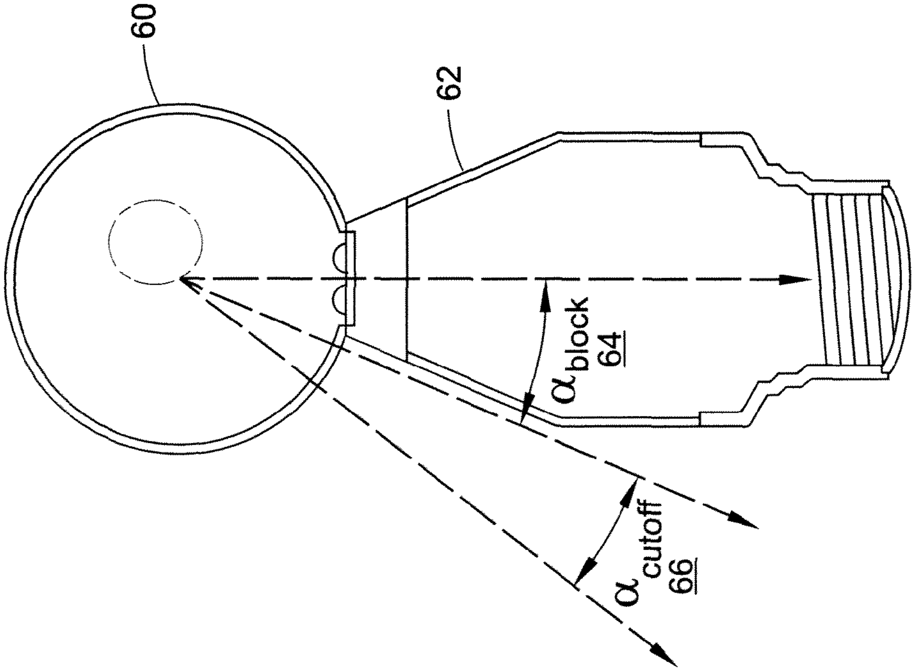
FIG. 6 diagrammatically shows the physical blocking angle at which a thermal heat sink obstructs light emitted from the light source, and the cutoff angle at which acceptable light distribution uniformity is obtained.

The angle of the heatsink base helps maintain a uniform light distribution to high angles (for example, at least 150°). FIG. 6 shows a schematic that defines an angular nomenclature for a typical LED attached to a thermal heatsink. In this example, a diffuser element, 60, is uniformly emitting light. The thermal heatsink, 62, is obstructing the emitted light at an blocking angle, 64, $\alpha_{block}$, taken from the optical axis to the point on the heatsink that physically obstructs light coming from the geometric center of the light source, 60. It will be difficult to generate significant intensity at angles smaller than 64, $\alpha_{block}$, due to the physical obstruction of the thermal heatsink. In practice, there will be a cutoff angle, 66, $\alpha_{cutoff}$, at which point the physical obstruction of the thermal heatsink will have minimal effect.

Figure 17:
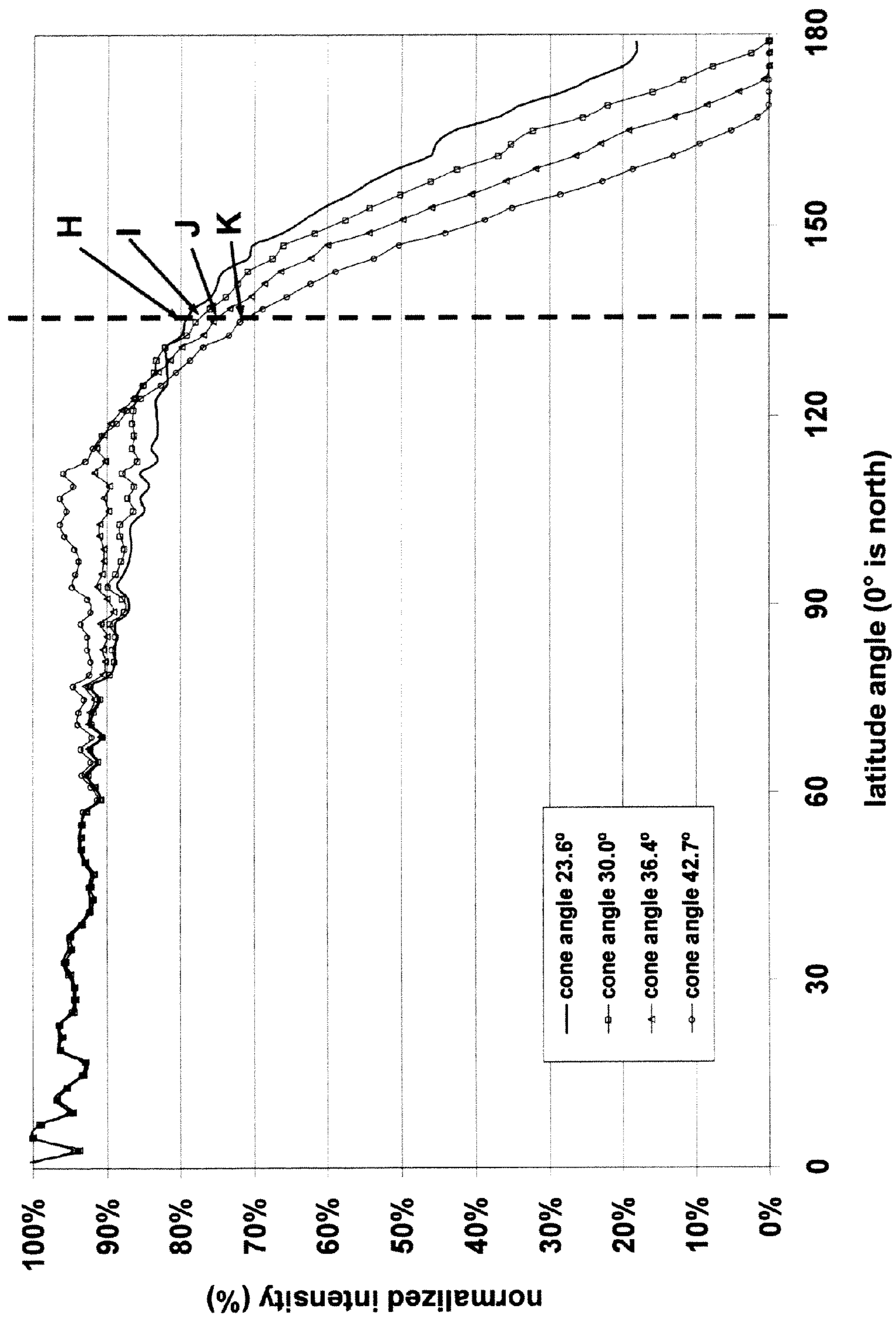
FIG. 17 shows optical raytrace modeling data showing the effect of the blocking angle of a heatsink on the design cutoff angle and intensity uniformity.

FIG. 17 shows the intensity distribution as a function of latitude angles for varying $\alpha_{block}$ values. At a latitude angle of 135° (equivalent to an $\alpha_{cutoff}$ of 45°), the normalized intensity for $\alpha_{block}$ values of 23.6°, 30°, 36.4°, and 42.7° are 79%, 78%, 76%, and 72%, respectively, shown as H, I, J, and K in FIG. 17. This clearly shows that as $\alpha_{block}$ approaches $\alpha_{cutoff}$ the intensity uniformity is dramatically reduced. For the practical limit of less than 5% reduction in intensity, $\alpha_{block}$ should be 10-15° less than the desired $\alpha_{cutoff}$ represented by the equation: $\alpha_{cutoff}=\alpha_{block}+10°$. This example at $\alpha_{cutoff}$ of 45° is clearly applicable to other $\alpha_{cutoff}$ angles and other desired reduction levels in intensity. For the case of an A-line like LED lamp, if the cutoff angle is >35°, it will be difficult to have a highly uniform intensity distribution in the latitude angles (forward to backward emitted light). Also, if the cutoff angle is too shallow <15°, there will not be enough room in the rest of the lamp to contain the LED driver electronics and lamp base. An optimal angle of 20-30° is desirable to maintain the light distribution uniformity, while leaving space for the practical elements in the lamp. The present LED lamp provides a uniform output from 0° to at least 120°, preferably 135°, more preferably 150°. This is an excellent replacement for traditional A19 incandescent light bulb.

It is desired to make the base 20, 22 large in order to accommodate the volume of electronics and in order to provide adequate heat sinking, but the base is also preferably configured to minimize the blocking angle, i.e. the latitude angle at which the omnidirectional light distribution is significantly altered by the presence of other lamp components, such as the electronics, heat sink base, and heat sink fins. For example, this angle could be at 135° or a similar angle to provide a uniform light distribution that is similar to present incandescent light sources. These diverse considerations are accommodated in the respective bases 20, 22 by employing a small receiving area for the LED-based light source sections 28, 30 which is sized approximately the same as the LED-based light source, and having sides angled, curved, or otherwise shaped at less than the desired blocking angle, preferably using a truncated cone shape. The sides of the base extend away from the LED-based light source for a distance sufficient to enable the sides to meet with a base portion 32, 34 of a diameter that is large enough to accommodate the electronics, and also mates to an appropriate electrical connection.

The optical properties of the thermal heat sink have a significant effect on the resultant light intensity distribution. When light impinges on a surface, it can be absorbed, transmitted, or reflected. In the case of most engineering materials, they are opaque to visible light, and hence, visible light can be absorbed or reflected from the surface. Concerns of optical efficiency, optical reflectivity, and reflectivity will refer herein to the efficiency and reflectivity of visible light. The absolute reflectivity of the surface will affect the total efficiency of the lamp and also the interference of the heat sink with the intrinsic light intensity distribution of the light source. Though only a small fraction of the light emitted from the light source will impinge a heat sink with heat fins arranged around the light source, if the reflectivity is very low, a large amount of flux will be lost on the heat sink surfaces, and reduce the overall efficiency of the lamp. Similarly, the light intensity distribution is affected by both the redirection of emitted light from the light source and also absorption of flux by the heat sink. If the reflectivity is kept at a high level, such as greater than 70%, the distortions in the light intensity distribution can be minimized. Similarly, the longitudinal and latitudinal intensity distributions can be affected by the surface finish of the thermal heat sink and surface enhancing elements. Smooth surfaces with a high specularity (mirror-like) distort the underlying intensity distribution less than diffuse (Lambertian) surfaces as the light is directed outward along the incident angle rather than perpendicular to the heat sink or heat fin surface.

Figure 8:
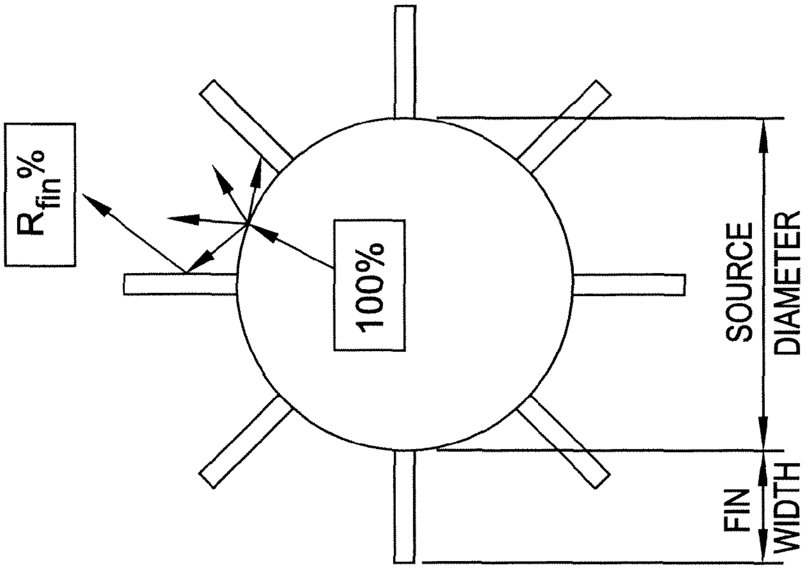
FIG. 8 is a schematic top view of an example lamps using vertical planar fins demonstrating optical light ray paths.

FIG. 8 shows a top view schematic of a typical lamp embodiment. The source diameter is taken to mean the diameter or other defining maximum dimension of the light transmissive envelope. This will define the relationship between the size of the light emitting region of the lamp and the width or other characteristic dimension of the surface enhancing elements of the thermal heat sink that will be interacting with emitted light. 100% of the emitted flux leaves the light transmissive envelope. Some fraction will interact with the surface area enhancing elements and the thermal heatsink. For the case of planar heat fins, this will be generally defined by the number of heat fins, the radial width of the heat fins, and the diameter of the light transmissive envelope. The overall efficiency will be reduced simply by the product of the fraction of flux that impinges the thermal heat sink and surface area enhancing elements and the optical reflectivity of the heat sink surfaces.

The thermal properties of the heat sink material have a significant effect on the total power that can be dissipated by the lamp system, and the resultant temperature of the LED device and driver electronics. Since the performance and reliability of the LED device and driver electronics is generally limited by operating temperature, it is critical to select a heat sink material with appropriate properties. The thermal conductivity of a material defines the ability of a material to conduct heat. Since an LED device has a very high heat density, a heat sink material for an LED device should preferably have a high thermal conductivity so that the generated heat can be moved quickly away from the LED device. In general, metallic materials have a high thermal conductivity, with common structural metals such as alloy steel, extruded aluminum and copper having thermal conductivities of 50 W/m-K, 170 W/m-K and 390 W/m-K, respectively. A high conductivity material will allow more heat to move from the thermal load to ambient and result in a reduction in temperature rise of the thermal load.

For example, in a typical heat sink embodiment, as shown in FIGS. 4 and 5, dissipating ~8 W of thermal load, the difference in temperature rise from ambient temperature was ~8° C. higher for a low thermal conductivity (50 W/m-K) compared to high conductivity (390 W/m-K) material used as a heat. Other material types may also be useful for heat sinking applications. High thermal conductivity plastics, plastic composites, ceramics, ceramic composite materials, nano-materials, such as carbon nanotubes (CNT) or CNT composites with other materials have been demonstrated to possess thermal conductivities within a useful range, and equivalent to or exceeding that of aluminum. Practical considerations, such as manufacturing process or cost may also affect the thermal properties. For example, cast aluminum, which is generally less expensive in large quantities, has a thermal conductivity value approximately half of extruded aluminum. It is preferred for ease and cost of manufacture to use one heat sinking material for the majority of the heat sink, but combinations of cast/extrusion methods of the same material or even incorporating two or more different heat sinking materials into heat sink construction to maximize cooling are obvious to those skilled in the art. The emissivity, or efficiency of radiation in the far infrared region, approximately 5-15 micron, of the electromagnetic radiation spectrum is also an important property for the surfaces of a thermal heat sink. Generally, very shiny metal surfaces have very low emissivity, on the order of 0.0-0.2. Hence, some sort of coating or surface finish may be desirable, such as paints (0.7-0.95) or anodized coatings (0.55-0.85). A high emissivity coating on a heat sink may dissipate approximately 40% more heat than a bare metal surface with a low emissivity. For example, in a typical heat sink embodiment, as shown in FIGS. 4 and 5, dissipating ~10 W of thermal load, the difference temperature rise from ambient temperature was 15° C. for a low emissivity (0.02) compared to high emissivity (0.92) surface on the heat sink. Selection of a high-emissivity coating must also take into account the optical properties of the coating, as low reflectivity or low specularity can adversely affect the overall efficiency and light distribution of the lamp, as described above.

Figure 7:
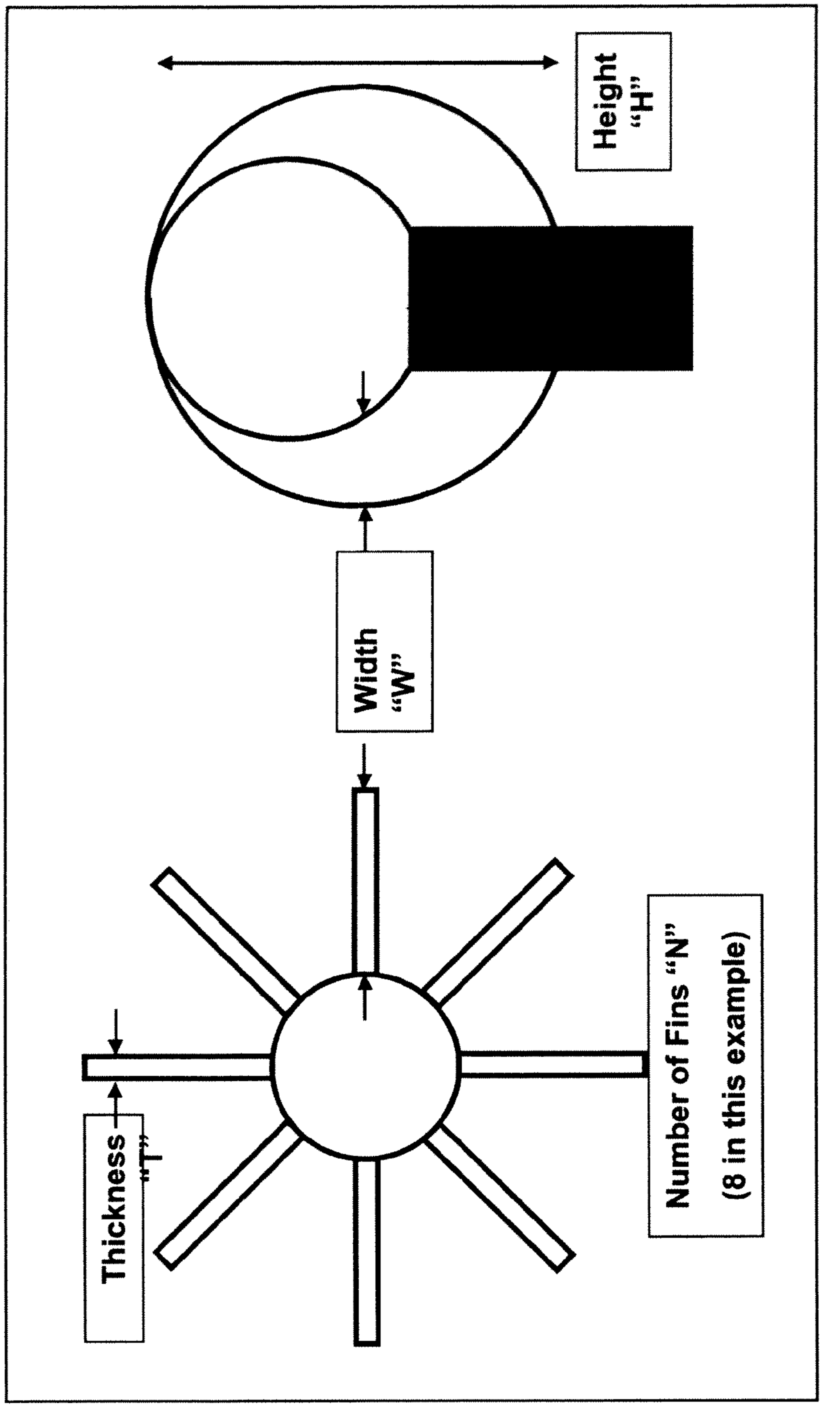
FIG. 7 demonstrates terms associated with the geometry of planar fins.

The fins can laterally extend from "geographic North" 0° to the plane of the cutoff angle, and beyond the cutoff angle to the physical limit of the electronics and lamp base cylinder. Only the fins between "geographic North" 0° to the plane of the cutoff angle will substantially interact optically with the emitted light distribution. Fins below the cutoff angle will have limited interaction. The optical interaction of the fins depends on both the physical dimensions and surface properties of the fins. As shown in FIG. 7, the physical dimensions of the fins that interact with the light distribution can be defined in simple terms of the width, thickness, height, and number of the fins. The width of the fins affect primarily the latitudinal uniformity of the light distribution, the thickness of the fins affect primarily the longitudinal uniformity of the light distribution, the height of the fins affect how much of the latitudinal uniformity is disturbed, and the number of fins primarily determines the total reduction in emitted light due to the latitudinal and longitudinal effects. In general terms, the same fraction of the emitted light should interact with the heat sink at all angles. In functional terms, to maintain the existing light intensity distribution of the source, the surface area in view of the light source created by the width and thickness of the fin should stay in a constant ratio with the surface area of the emitting light surface that they encompass.

To minimize the latitudinal effects, the width of the fins would ideally taper from a maximum at the 90° equator to a minimum at the "geographic North" 0° and to a fractional ratio at the plane of the cutoff angle. Functionally, however, the preferred fin width may be required to vary to meet not only the physical lamp profile of current regulatory limits (ANSI, NEMA, etc.), but for consumer aesthetics or manufacturing constraints as well. Any non-ideal width will negatively effect the latitudinal intensity distribution and subsequent Illuminance distribution.

Figure 15:
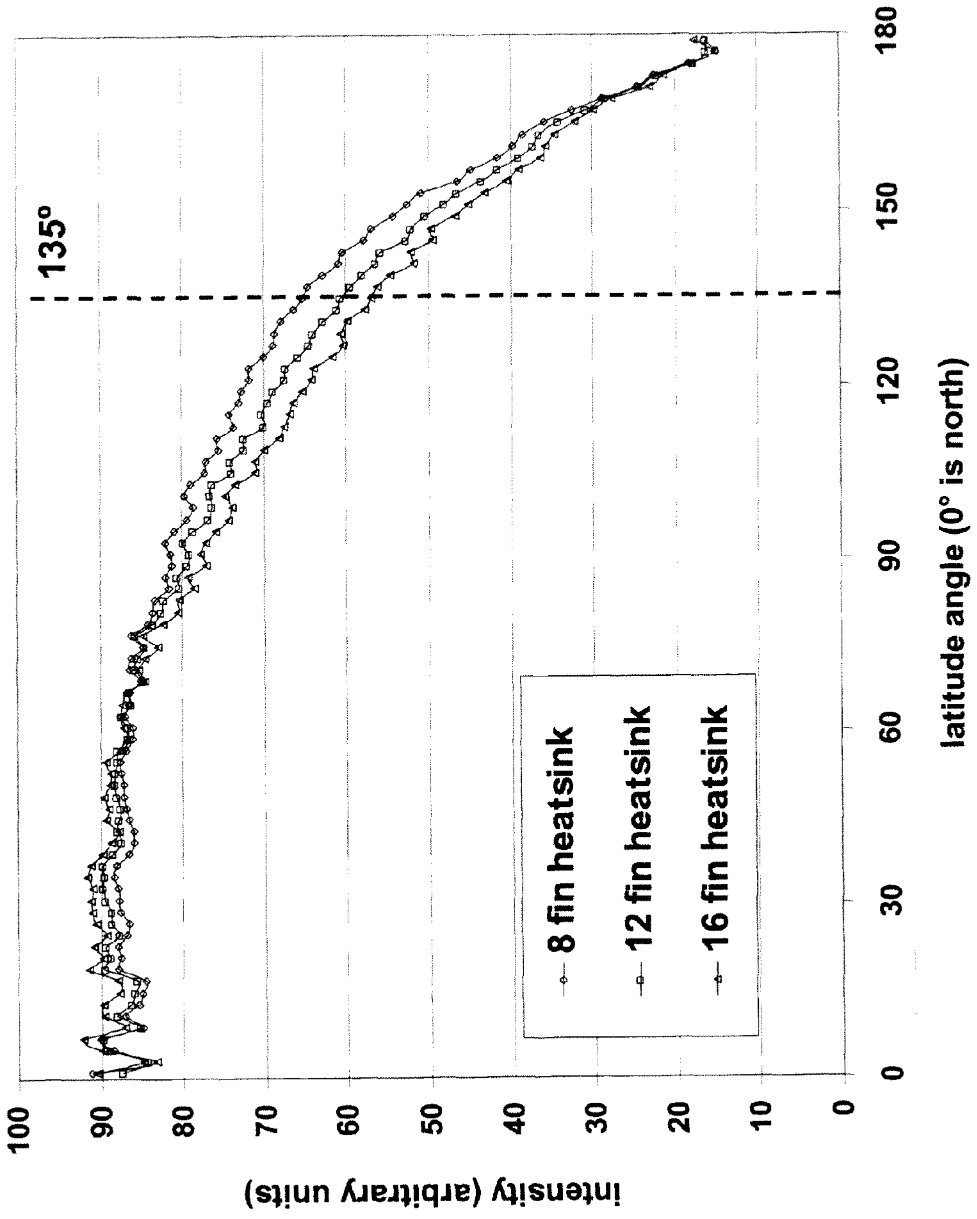
FIG. 15 shows the effect of increasing the number of heat fins on the light intensity distribution in latitude angles for a typical embodiment.

Substantially planar heat fins by design are usually thin to maximize surface area, and so have substantially limited extent in the longitudinal direction, i.e. the thickness. In other words, each fin lies substantially in a plane and hence does not substantially adversely impact the omnidirectional nature of the longitudinal intensity distribution. A ratio of latitudinal circumference of the light source to the maximum individual fin thickness equal to 8:1 or greater is preferred. To further maximize surface area, the number of fins can be increased. The maximum number of fins while following the previous preferred ratio of fin thickness is generally limited by the reduction in optical efficiency and intensity levels at angles adjacent to the south pole due to absorption and redirection of light by the surfaces of the heat fins. FIG. 15 shows the effect of increasing the number of fins in a nominal design on the intensity uniformity in the latitude angles. For example, at an angle of 135° from the north pole, 0°, the intensity is 79%, 75%, and 71% of the average intensity from 0-135° for 8, 12, and 16 heat fins, respectively. This is shown for fins with 90% optical reflectivity, and 50% specular surfaces. Increasing the number of fins in this case also reduces the overall optical efficiency by ~3% for each 4 fin increase. This effect is also multiplied by the inherent reflectance of the heat sink surfaces.

As stated earlier, the fins are provided for heat sinking. To provide some light along the upward optical axis, they will typically have thin end sections with a relatively thicker intermediate section. Also critically important to maintaining a uniform light intensity distribution is the surface finish of the heat sink. A range of surface finishes, varying from a specular (reflective) to a diffuse (Lambertian) surface can be selected. The specular designs can be a reflective base material or an applied high-specularity coating. The diffuse surface can be a finish on the base heat sink material, or an applied paint or other diffuse coating. Each provides certain advantages and disadvantages. For example, a highly reflective surface the ability to maintain the light intensity distribution, but may be thermally disadvantageous due to the generally lower emissivity of bare metal surfaces. In addition, highly specular surfaces may be difficult to maintain over the life of a LED lamp, which is typically 25,000-50,000 hours. Alternatively, a heat sink with a diffuse surface will have a reduced light intensity distribution uniformity than a comparable specular surface. However the maintenance of the surface will be more robust over the life of a typical LED lamp, and also provide a visual appearance that is similar to existing incandescent omnidirectional light sources. A diffuse finish will also likely have an increased emissivity compared to a specular surface which will increase the heat dissipation capacity of the heat sink, as described above. Preferably, the coating will possess a high specularity surface and also a high emissivity, examples of which would be high specularity paints, or high emissivity coatings over a high specularity finish or coating.

Figure 16:
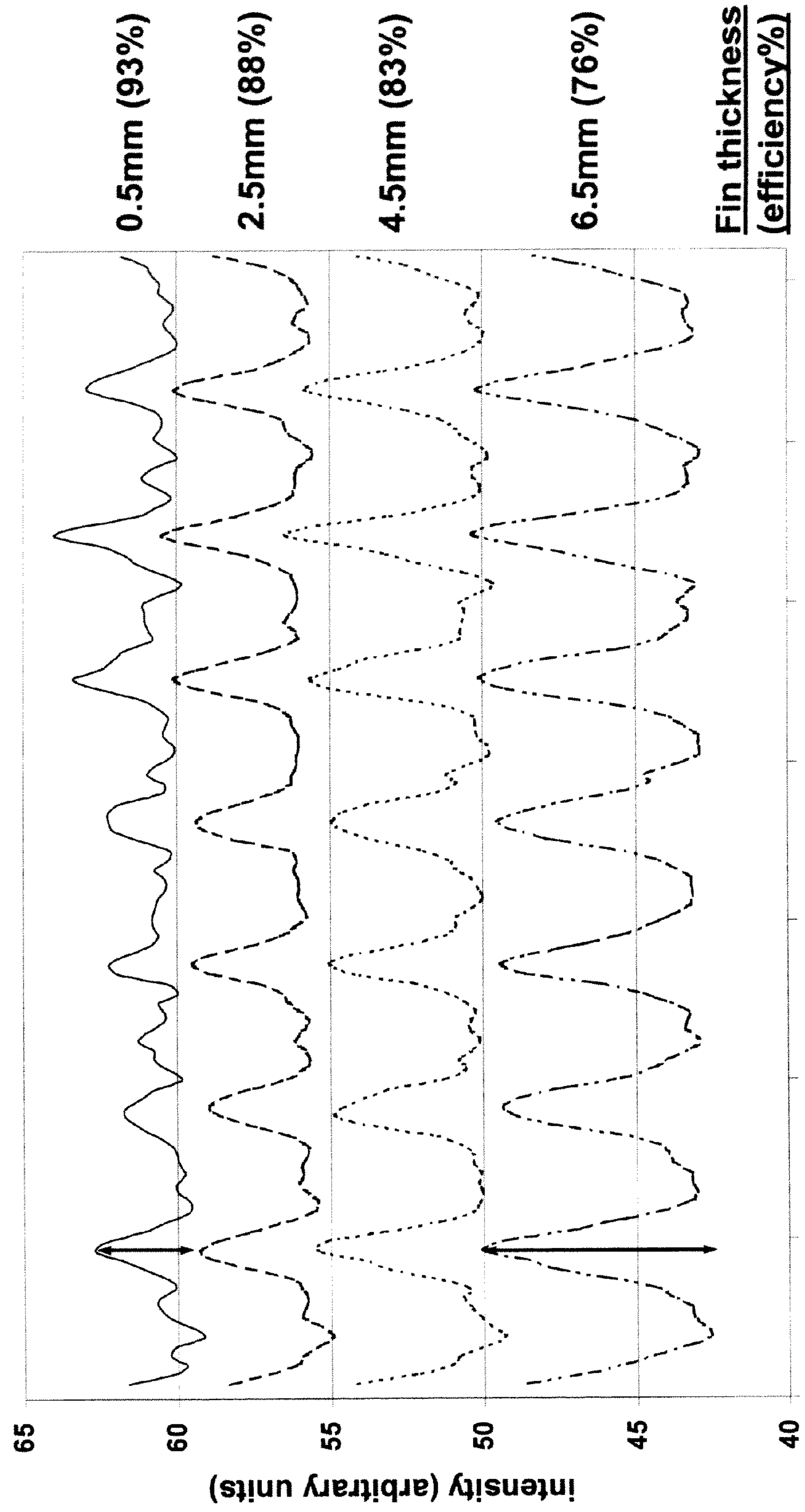
FIG. 16 shows the effect of increasing the thickness of the heat fins on the longitudinal intensity distribution.

It is desirable that the heat from the LEDs is dissipated to keep the junction temperatures of the LED low enough to ensure long-life. Surprisingly, placing a plurality of thin heat fins around the emitting light source itself does not significantly disturb the uniform light intensity in the longitudinal angles. Referring to FIG. 16, the effect of varying thickness heat fins on the longitudinal intensity distribution at the lamp equator is shown. This embodiment possessed 8 fins with an 80% optical reflectivity, diffuse surface finish, and 40 mm diameter of light emitting envelope. The magnitude of the distortion of the uniform intensity distribution can be characterized by the minimum to maximum peak distances. For the case of a 0.5 mm thick heat fin, the distortion is only ±2%, while at 6.5 mm thickness, the distortion is ±9%. Intermediate values provide intermediate results. In addition, the overall optical efficiency is also reduced as the fin thickness increases as a larger amount of flux from the light source is impingent on the thermal heat sink, varying from 93% at 0.5 mm fin thickness to 76% at 6.5 mm. Again, intermediate values produce intermediate results. At a desired level of distortion is less than ±5%, the light source diameter to the fin thickness must be kept above a ratio of approximately 8:1. Also, a desired level of overall optical efficiency must be selected, commonly greater than 80%, preferably greater than 90%, that will also constrain the desired fin thickness. For example, in an A19 embodiment, the heat fins are kept to a maximum thickness such as less than 5.0, preferably less than 3.5 millimeters, and most preferably between 1.0 and 2.5 millimeters to avoid blocking light, while still providing the correct surface area and cross-sectional area for heat dissipation. A minimum thickness may be desired for specific fabrication techniques, such as machining, casting, injection molding, or other techniques known in the industry. The shape is preferably tapered around the light source, with its smallest width at 0° (above lamp) as not to completely block emitted light. The heat fins will start at the heat sink base and extend to some point below 0°, above the lamp, to avoid blocking light along the optical axis, while providing enough surface area to dissipate the desired amount of heat from the LED light source. The design can incorporate either a small number of large width heat fins or a large number of smaller ones, to satisfy thermal requirements. The number of heat fins will generally be determined by the required heat fin surface area needed to dissipate the heat generated by the LED light source and electronic components in the lamp. For example, a 60 W incandescent replacement LED lamp may consume roughly 10 W of power, approximately 80% of which must be dissipated by the heat sink to keep the LED and electronic components at a low enough temperature to ensure a long life product.

High reflectance (>70%) heatsink surfaces are desired. Fully absorbing heatsink (0% reflective) surfaces can absorb approx. 30% of the emitted light in a nominal design, while approx. 1% is blocked if the fins have 80-90% reflectance. As there are often multiple bounces between LED light source, optical materials, phosphors, envelopes, and thermal heat sink materials in an LED lamp, the reflectivity has a multiplicative effect on the overall optical efficiency of the lamp. The heat sink surface specularity can also be advantageous. Specular surfaces smooth the peaks in the longitudinal intensity distribution created by having heat fins near the spherical diffuser, while the peaks are stronger with diffuse surfaces even at the same overall efficiency. Peaks of approximately ±5% due to heat fin interference present in a diffuse surface finish heat sink can be completely removed by using a specular heat sink. If the distortions in the longitudinal light intensity distribution are kept below ~10% (±5%), the human eye will perceive a uniform light distribution. Similarly, the intensity distribution in latitude angles is benefited. 5-10% of the average intensity can be gained at angles below the lamp (for example, from 135-150°) by using specular surfaces over diffuse.

Figure 10:
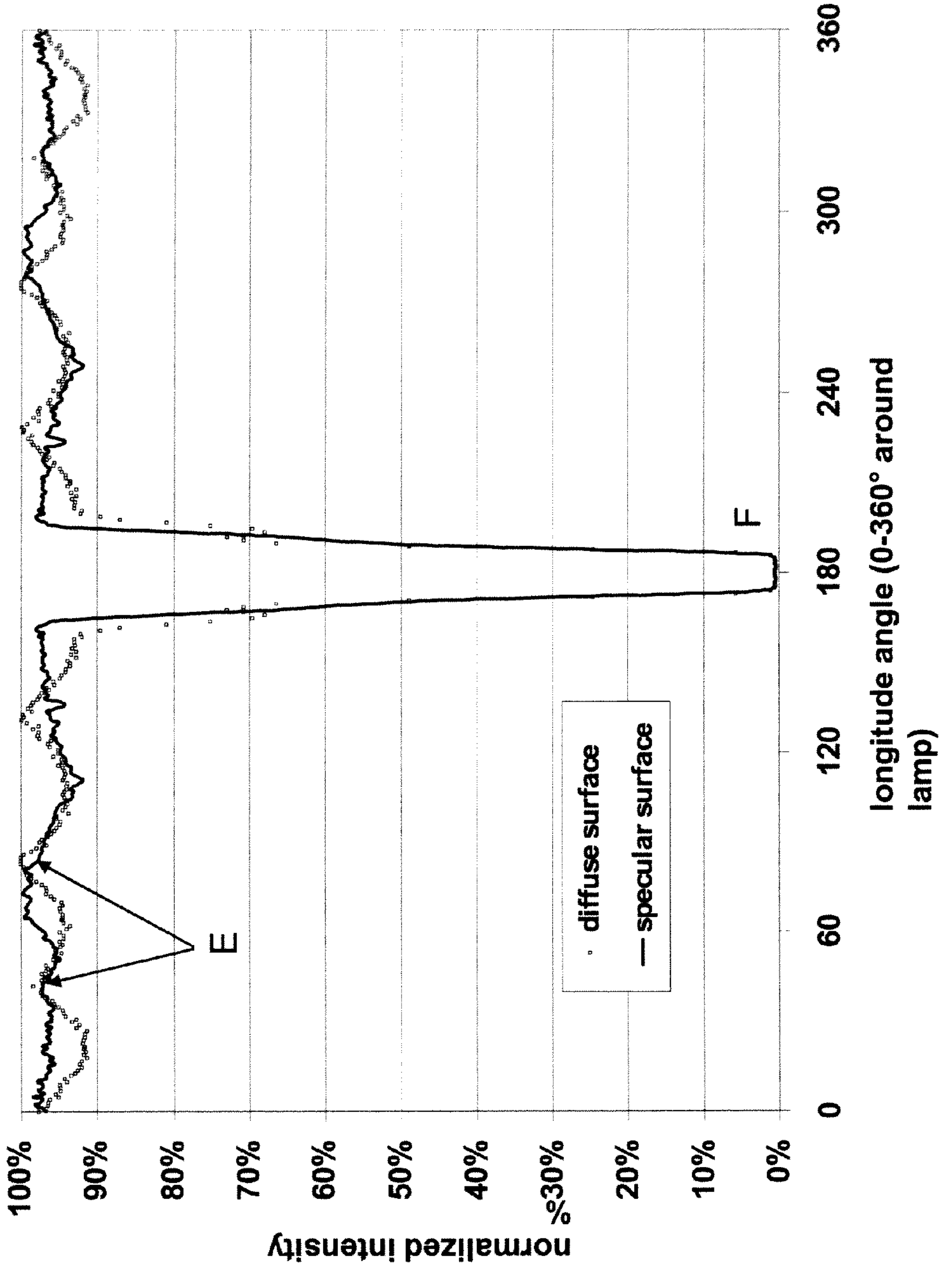
FIG. 10 illustrates light intensity in varying longitudinal angles 360° around the equator of the lamps of FIGS. 4 and 5.

Referring now to FIG. 10, the surprisingly limited impact of the fins on the longitudinal light intensity distribution of the lamp is demonstrated. In this case, the designs consisted of a thermal heat sink with 8 vertical planar fins with a thickness of 1.5 mm., and either diffuse or specular surface finish. The fins in both designs possess a ratio of radial width "W" to light emitting envelope diameter of ~1:4. These embodiments are graphically represented in FIGS. 4 and 5. Clearly, the variation in light intensity at θ=90° was minimal throughout ϕ=0-360° for both diffuse and specular fins, with ±5% variation, shown at E, in measured intensity for the diffuse heat fins, and less than ±2% using specular heat fins. This illustrates the advantages of placing appropriately dimensioned surface area enhancing elements around or adjacent to the light source to gain surface area without disturbing the longitudinal light intensity distribution. Furthermore, the advantage of a substantially specular surface finish compared to a diffuse surface is demonstrated in practice. The deep reduction in intensity at F, is an artifact from the measurement system.

Figure 11:
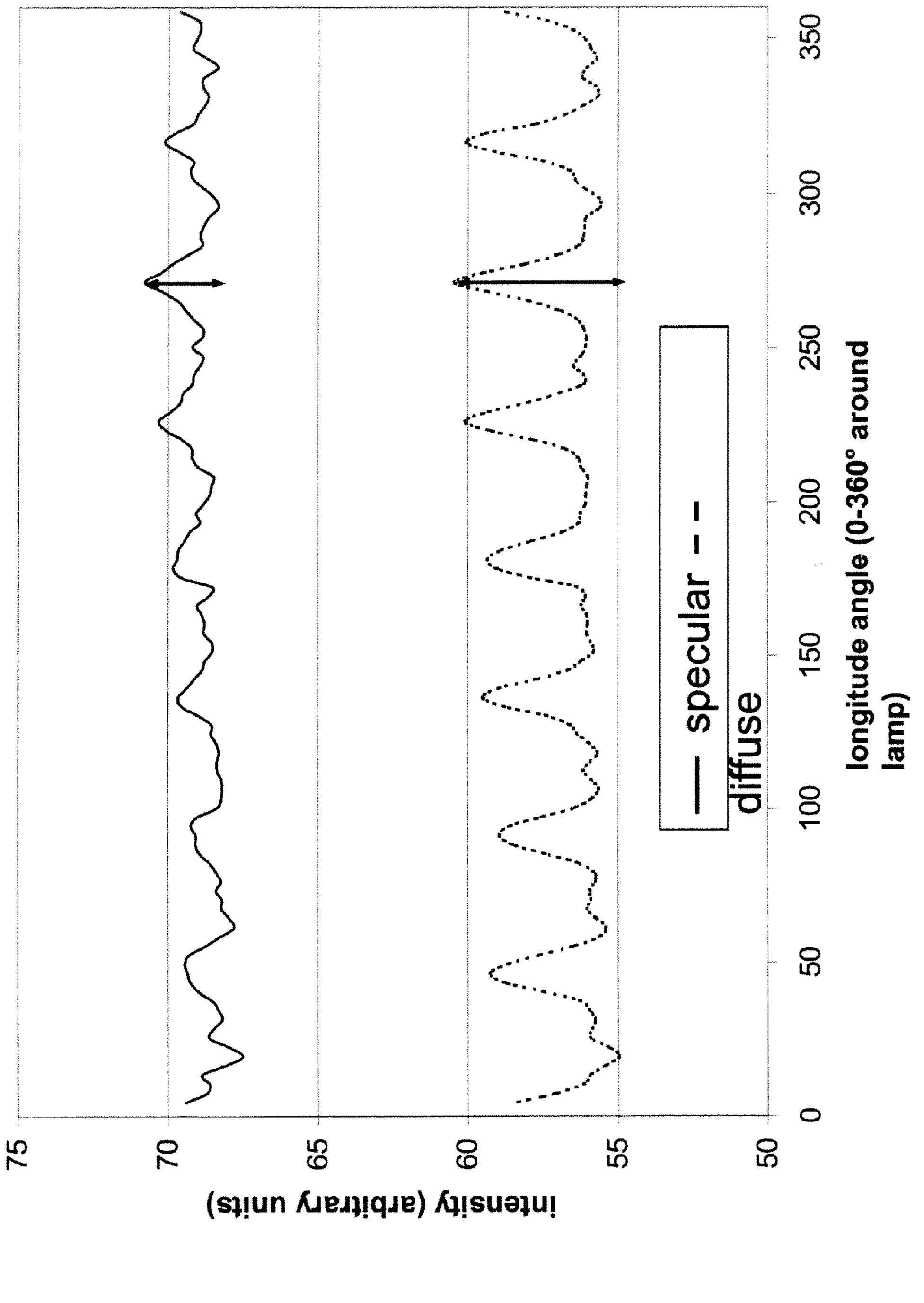
FIG. 11 illustrates optical modeling data of the light intensity in varying longitudinal angles 360° around an exemplary lamp having 12 heat fins with different surface finishes (specular and diffuse).

FIG. 11 demonstrates optical modeling results for a typical 8 fin lamp design. Both perfectly specular and diffuse fin surfaces were evaluated. The intensity distribution of each was evaluated in the longitudinal angles from 0-360° around the lamps equator using optical raytrace modeling. Diffuse fins showed approximately a ±4% variation in intensity, while specular surfaces showed virtually no variation. Either would provide a uniform light distribution, while a clear preference is seen for surfaces with a specular or near-specular finish.

Figure 12:
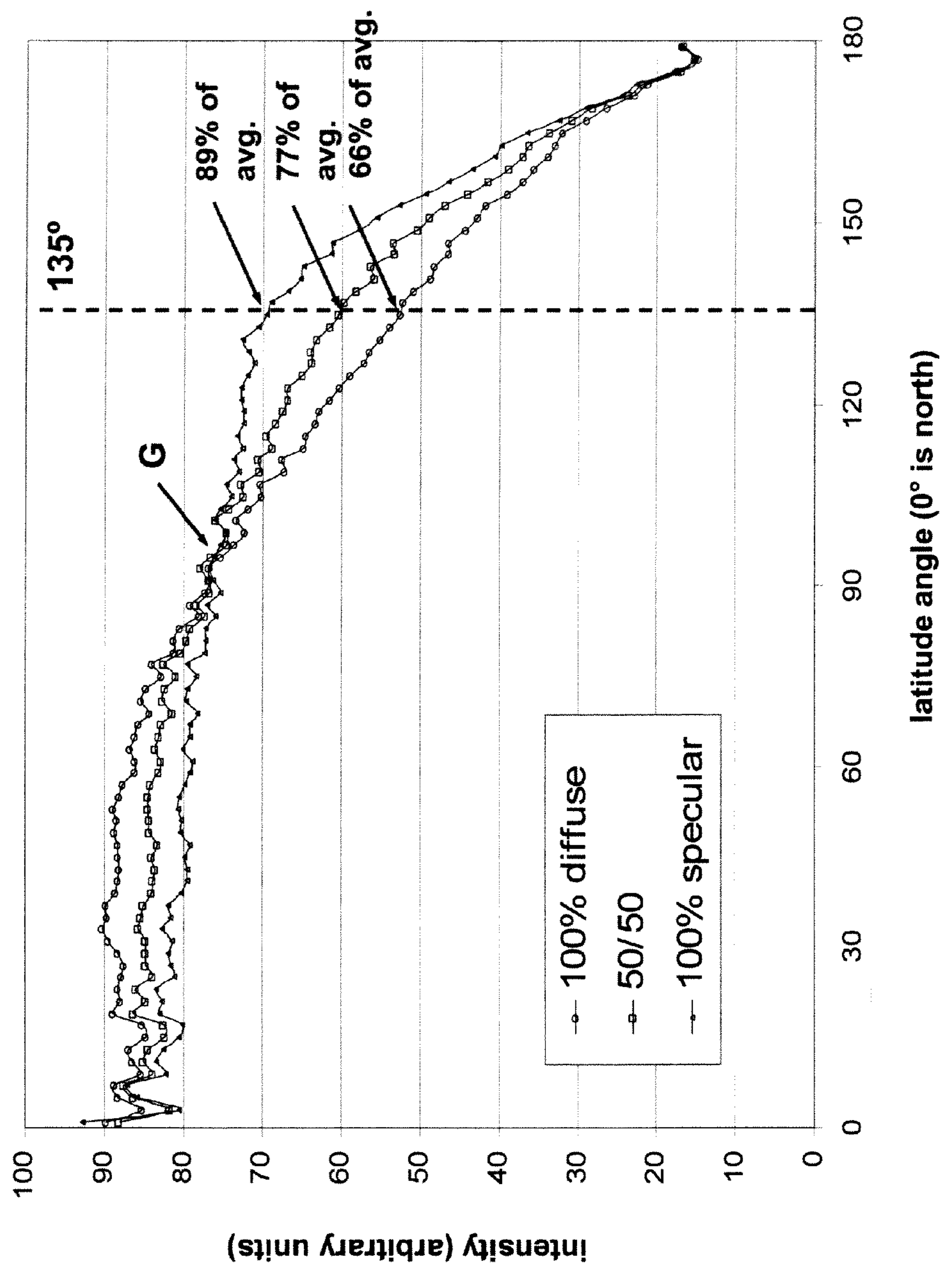
FIG. 12 shows optical ray trace modeling data demonstrating the effect of the surface specularity on the intensity distribution of the lamp as a function of latitude angle.

Referring now to FIG. 12, the benefits of using a specular surface finish on thermal heat sink regions that interact with light emitted from a typical LED lamp are demonstrated for the uniformity of the light intensity distribution in latitude angles. The intensity level at angles adjacent to the south pole (in this example, 135°, identified with arrows) is shown to be 23% higher for a specular surface compared to a diffuse surface when compared to the average intensity from 0-135°. Also shown is the intensity distribution for a 50% specular and 50% diffuse surface that captures approximately half the benefit of a fully specular surface in average intensity. The effect of the specularity of the surface cannot be understated as it has a dual effect benefiting the uniformity of the light intensity distribution. Point G on the graph defines a point that will be referred to as the 'pivot' point of the intensity distribution, which is nominally located in the equator of this design. As the specularity of the heat sink surfaces increases, the intensity to the north of the pivot decrease, and to the right of the pivot, increase. This reduces the average intensity as well as increasing the southward angle at which uniformity is achieved. This is critical to generating a uniform intensity distribution down to the highest angle possible adjacent to the south pole.

Figure 2:
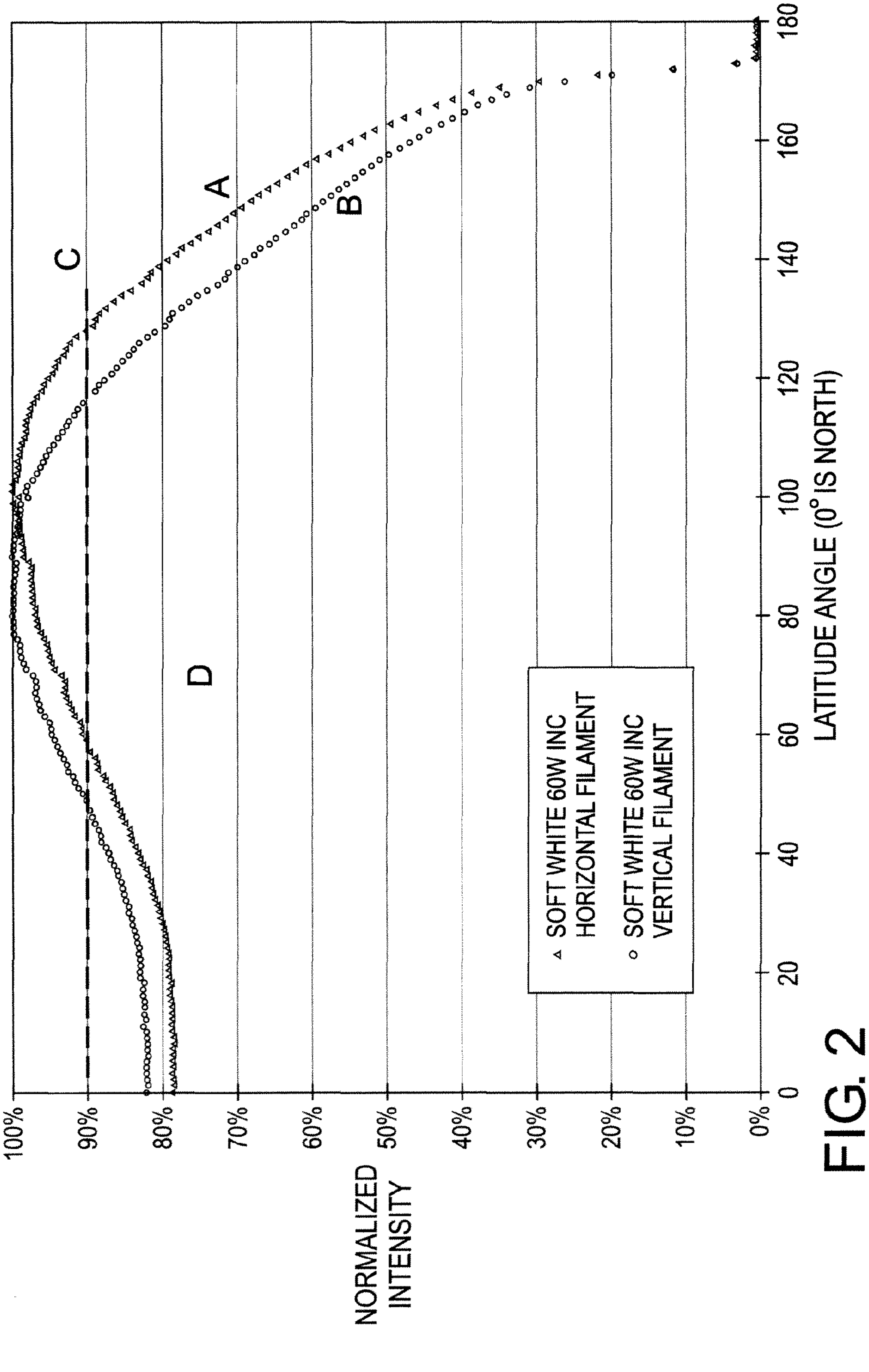
FIG. 2 demonstrates intensity distribution of incandescent lamps at various latitudes.

Referring again to FIG. 8, the effectiveness of the present lamp design is illustrated. Moreover, it is demonstrated by light ray tracing that the fins, if provided with a specular (FIG. 2) or diffuse (FIG. 3) surface effectively direct light. Moreover, it can be seen that high overall optical efficiencies are obtainable when high reflectance heat sink materials or coatings are used in a lamp embodiment. Since only a fraction (~⅓) of the light emitted by the diffuse LED light source is impingent on the heat sink surface, a high reflectivity heat sink surface will only absorb a small percentage (<5%) of the overall flux emitted from the diffuse LED light source.

Figure 9:
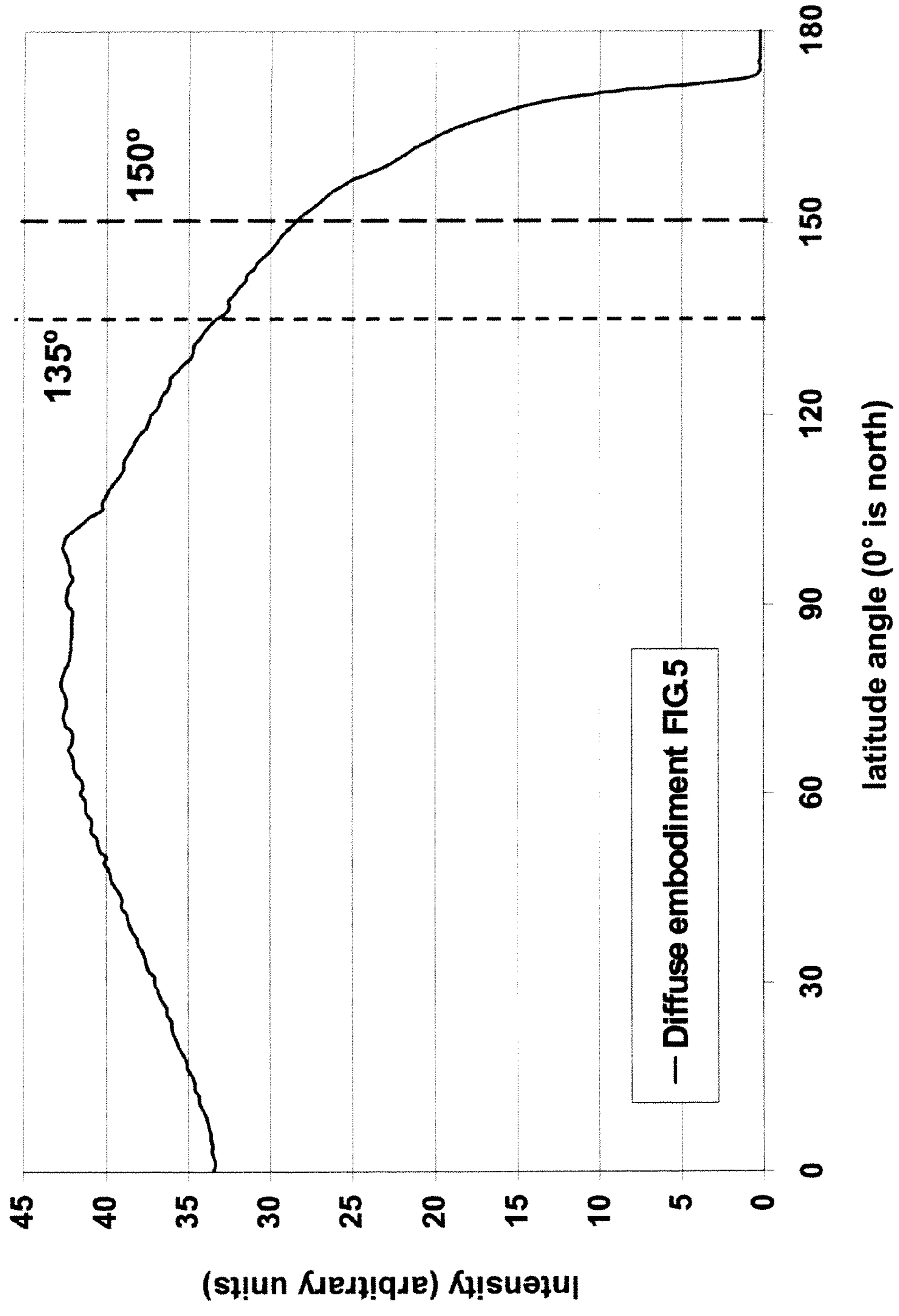
FIG. 9 illustrates light intensity at various latitude angles for the omnidirectional LED-based lamps of FIG. 5.

Referring to FIG. 9, it can be seen that the present design (FIG. 5) provides adequate light intensity adjacent its south pole. The dashed lines on the figure show the intensity of the measured data at both 135° and 150° that are useful angles to characterize the omnidirectional nature of the light intensity distribution. Moreover, there is no more than a ±10% variation in average intensity from 0 to 135° viewing angles, which would meet or exceed several separate possible light intensity uniformity requirements. It would exceed the U.S. DoE Energy Star proposed draft 2 specification (±20% at 135°), and equivalency with the performance of standard Soft White incandescent lamps (±16% at 135°), which are the current preferred omnidirectional light source available. At a 150° viewing angle, the ±20% variation would exceed the to the performance of standard Soft White incandescent lamps, and nearly meet the U.S. DoE Bright Tomorrow Lighting Prize (±10% at 150°). FIG. 9 demonstrates the effectiveness of the present lamp design to achieve this result.

Figure 13D:
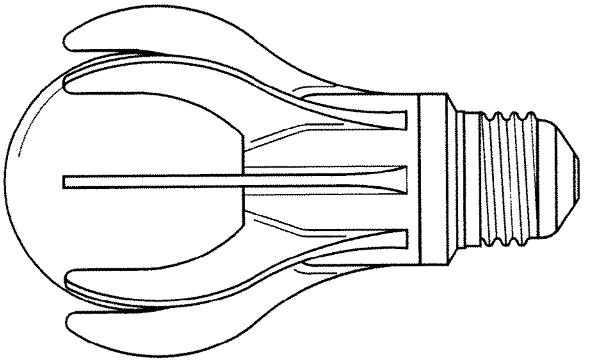
FIG. 13 illustrates alternative embodiments of thermal heatsink designs employing heat fins adjacent the light source containing envelope.
Figure 13C:
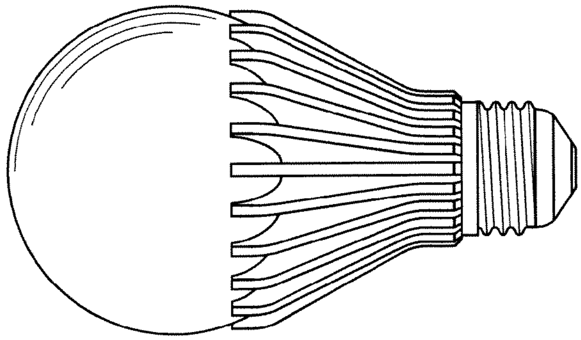
Figure 13B:
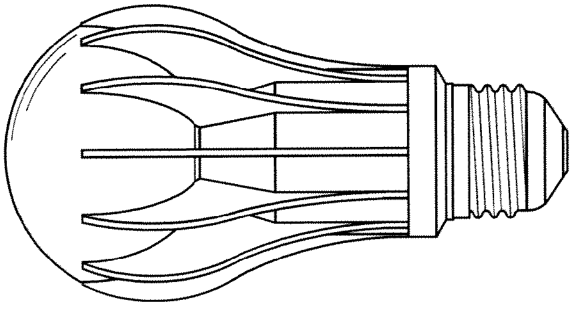
Figure 13A:
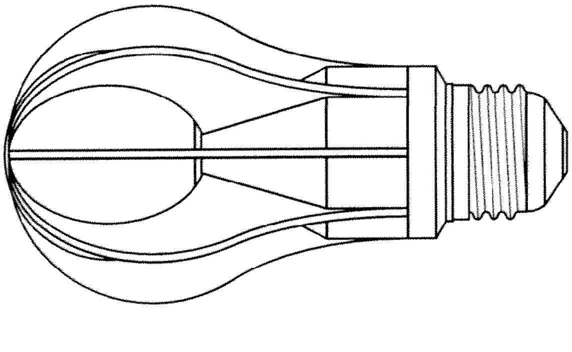

FIGS. 13*a-d*. demonstrates another preferred fin and envelope design within the scope of the present disclosure. FIG. 13*a* shows an embodiment where vertical heat fins surround a substantially spherical light emitting diffuser. The heat fins are tapered towards geographic north and provide a preferred light intensity distribution. FIG. 13*b* shows an embodiment where the vertical heat fins extend only to the equator of a light-transmissive envelope. This provides the additional benefit of ease of assembly and manufacture as the LED light source and envelope can be easily inserted from the top (geographic north) of the heat sink and are not completely encompassed by the heat sink as in FIG. 13*a*. FIG. 13*c* shows a light-transmissive envelope with vertical heat fins that encompass an even smaller portion of the light-emitting region. FIG. 13*d* demonstrates a combination of FIGS. 13*a* and 13*b* where additional surface area is gained by extending the vertical heat fins past the equator but at a tangent to the equator so the assembly and manufacturing benefits of FIG. 13*b* are retained. Additionally, FIGS. 13*b* and 13*c* demonstrate the application of the surface area enhancing elements around various envelope and light source shapes.

Figure 14:
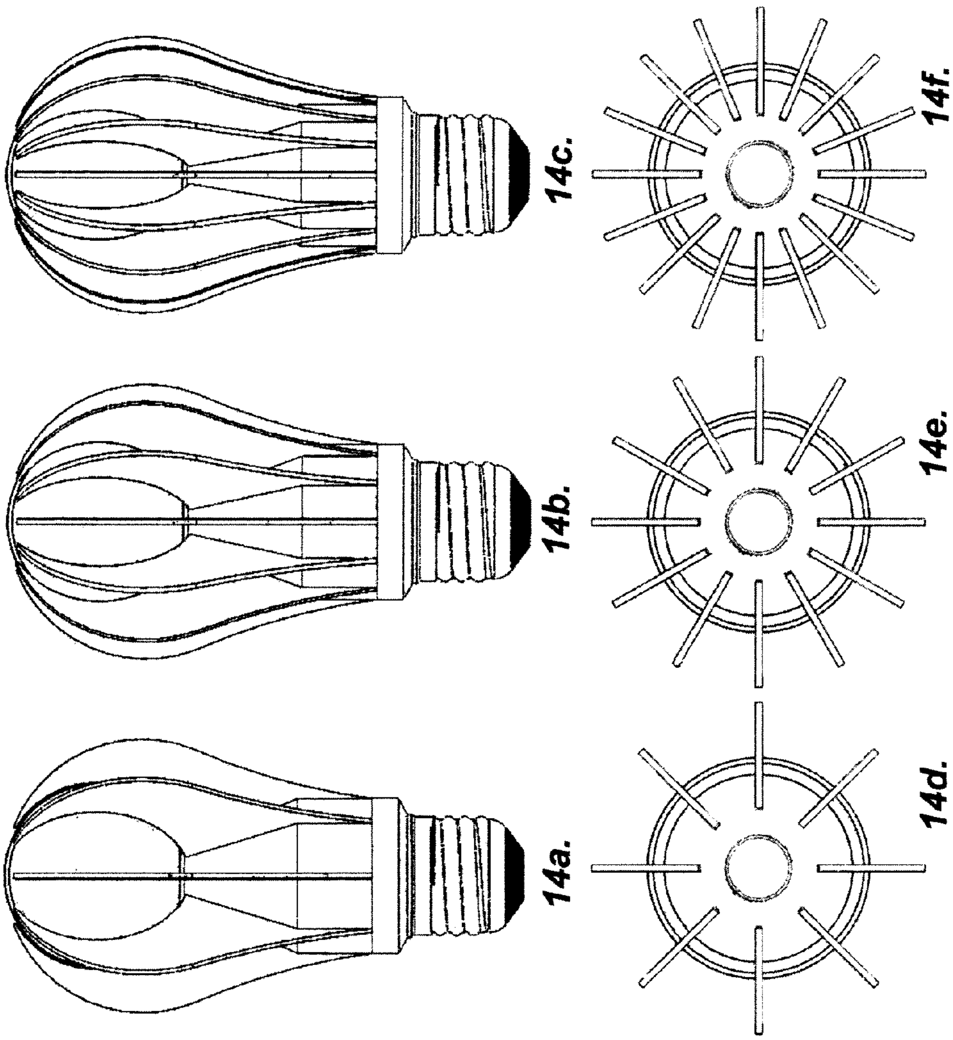
FIG. 14 illustrates alternative embodiments of a preferred embodiment with different numbers of surface area enhancing elements adjacent to the light source.

FIGS. 14*a-f*. demonstrates the effects of adding additional surface area enhancing elements within the scope of the present disclosure. FIGS. 14*a* and 14*d* show side and top views of a typical lamp embodiment possessing 8 vertical planar heat fins. FIGS. 14*b* and 14*e* show side and top views of a typical lamp embodiment possessing 12 vertical planar heat fins. FIGS. 14*c* and 14*f* show side and top views of a typical lamp embodiment possessing 16 vertical planar heat fins. Clearly, the heat dissipating capacity of the designs using higher numbers of fins is enhanced by the increased surface area exposed to the ambient environment, at the cost of light intensity uniformity in the latitude angles, as previously shown and discussed in FIG. 15. One particularly useful embodiment may be to alter the number of fins for aesthetic or manufacturing concerns is to move the heat fin orientation from purely vertical to an angle, θ, away from the optical axis. Given that the heat fins would have the same vertical height, they would possess a factor of 1/cos θ greater surface area than the purely vertical fins. In this case, the number of fins could be reduced by a factor of 1/cos(θ) and the system would possess approximately the same thermal and optical performance.

Figure 18:
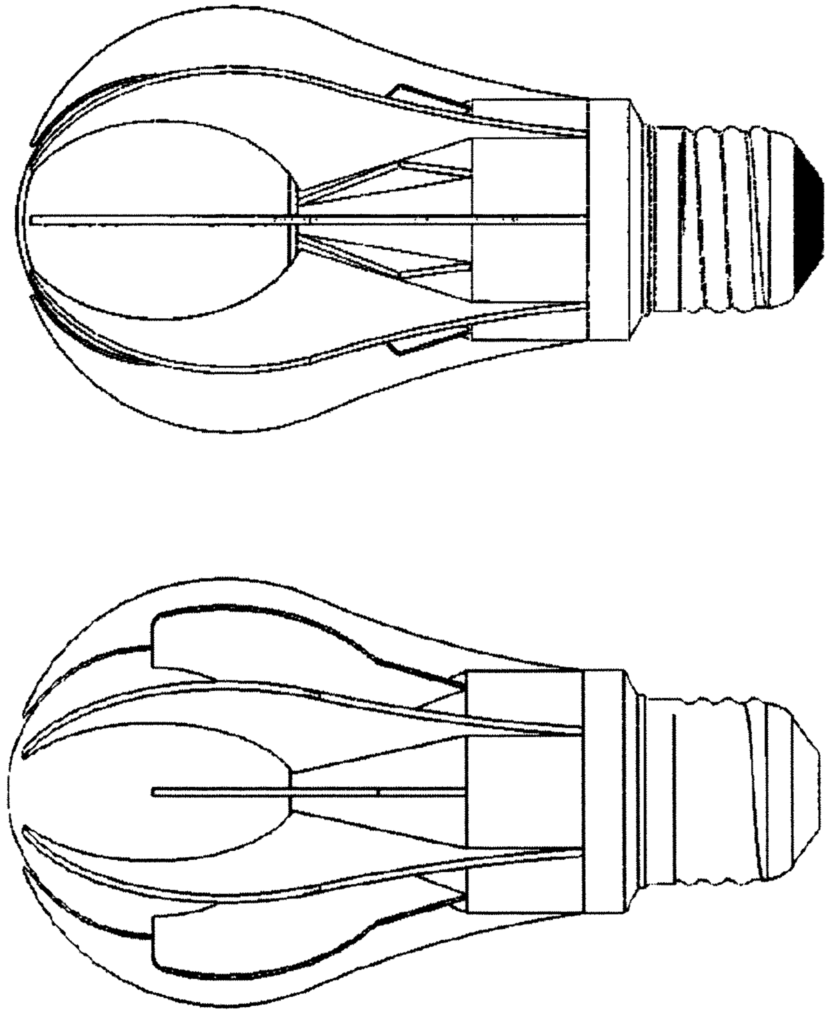
FIG. 18 shows embodiments of thermal heatsink designs employing varying length heat fin elements.

FIGS. 18*a-b*. demonstrate alternate embodiments of surface area enhancing elements of different lengths. To achieve the desired level of heat dissipation, heat fins of different vertical lengths and shape may be employed. For example, FIG. 18*a* shows two shape and length heat fins, where the shorter one has a tapered shape that is designed to minimize the interference with the light intensity distribution by possessing a proportionate surface area with the light-emitting area of the lamp. This provides additional surface area for heat dissipation without significant interference with the light intensity distribution. FIG. 18*b*. demonstrates another method to increase surface area without substantially decreasing the light intensity uniformity. If the additional shorter length heat fins are added below $\alpha_{cutoff}$ (see FIG. 6 for reference), the impact on the intensity distribution will be minimal but surface area will be added to the heat sink.

Figure 19:
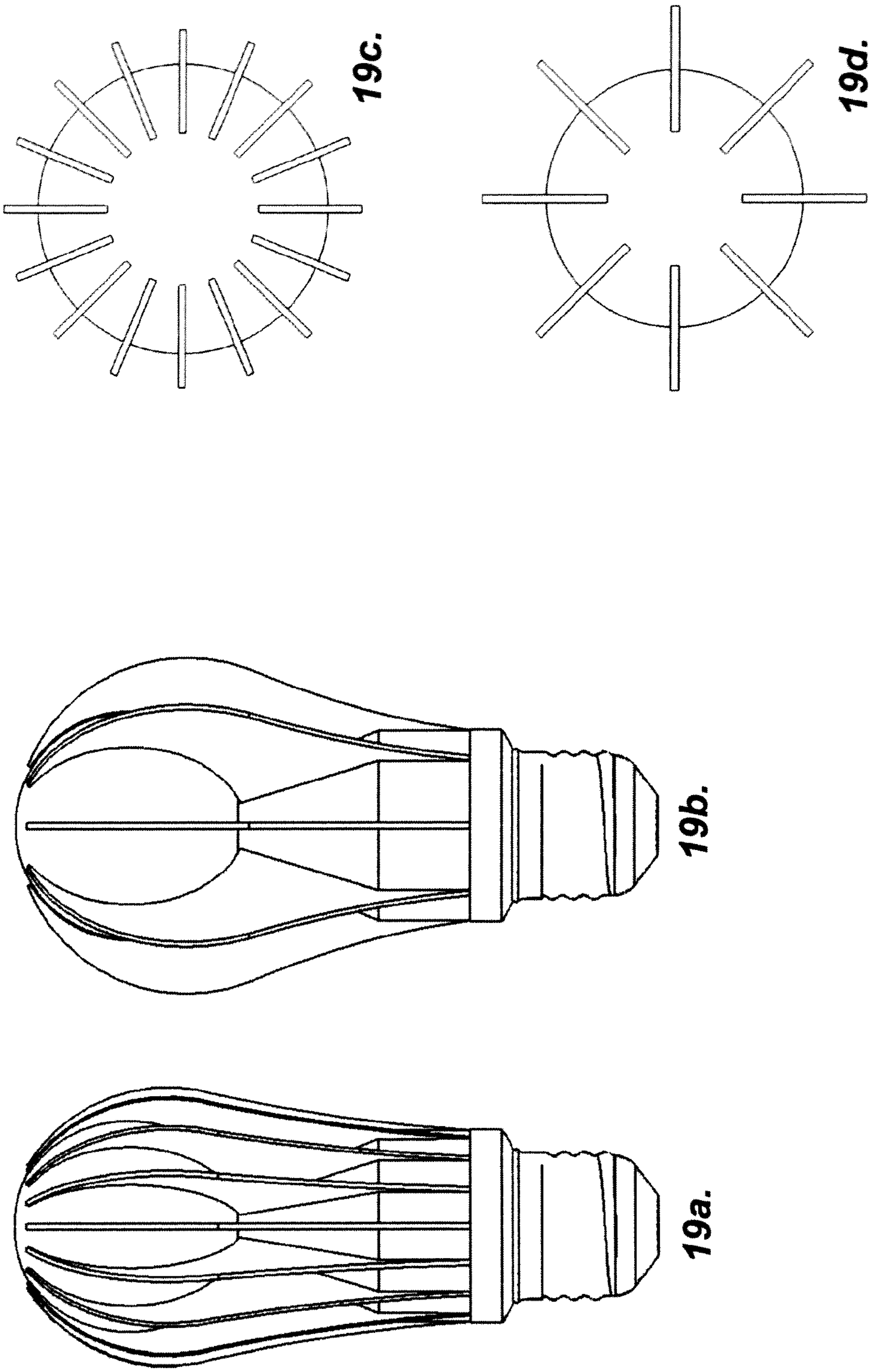
FIG. 19 shows embodiments of thermal heatsink designs employing varying number and width of heat fins while maintaining a similar surface area for heat dissipation.

FIGS. 19*a-d*. demonstrate alternate embodiments of a typical lamp embodiment with similar surface area but different employment of surface area enhancing elements. FIGS. 19*a*. and 19*c*. show a side and top view of a typical embodiment possessing 16 vertical planar fins with a radial width of approximately ⅙ of the light emitting envelope diameter. FIGS. 19*b*. and 19*d*. show the side and top view of a typical lamp embodiment possessing 8 vertical planar fins with a radial width of approximately ⅓ of the light emitting envelope. It is clear that the surface area of the heat fins, and proportionally thermal dissipation and optical efficiency is equivalent in both cases. Larger or smaller numbers of fins may be desired for aesthetic, manufacturing, or other practical concerns. It is also demonstrated that a large number of smaller width fins may provide more internal volume for heat sink, electronics, light source, and optical elements within a constrained geometry, such as an incandescent replacement lamp application.

Figure 20:
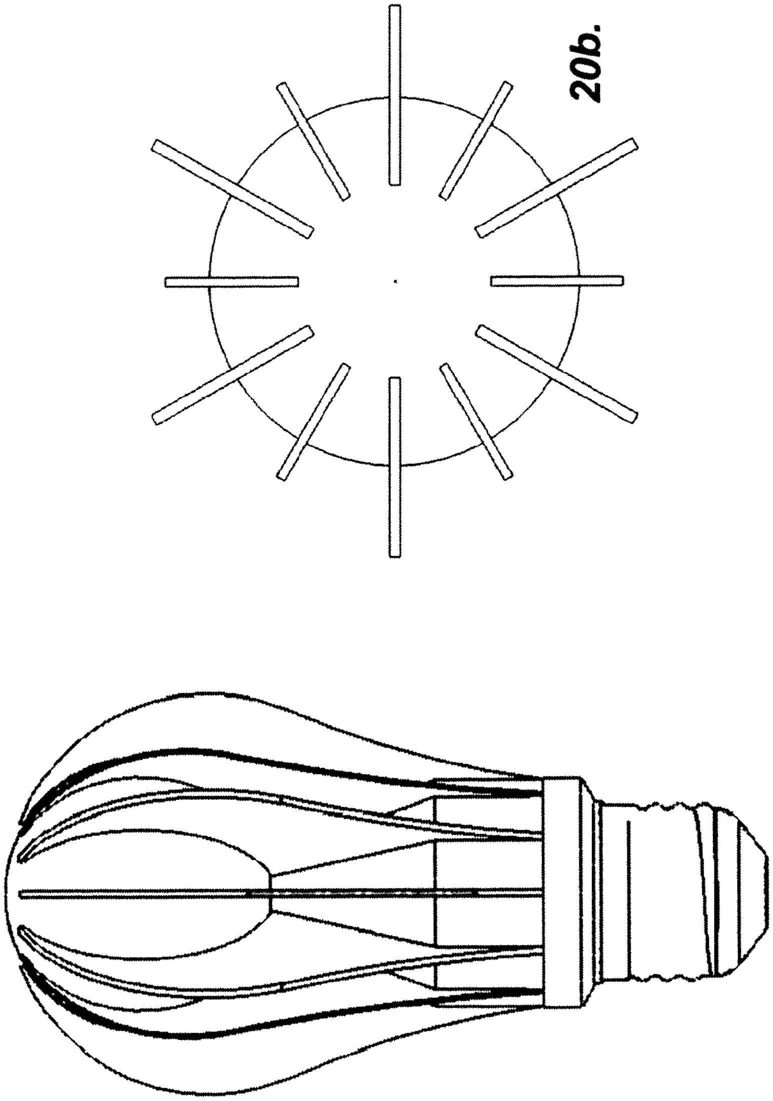
FIG. 20 shows embodiments of thermal heatsink designs employing varying width heat fin elements.

FIGS. 20*a-b*. demonstrate side view and top view of a typical lamp embodiment employing a combination of different widths of vertical planar heat fins.

Figure 21:
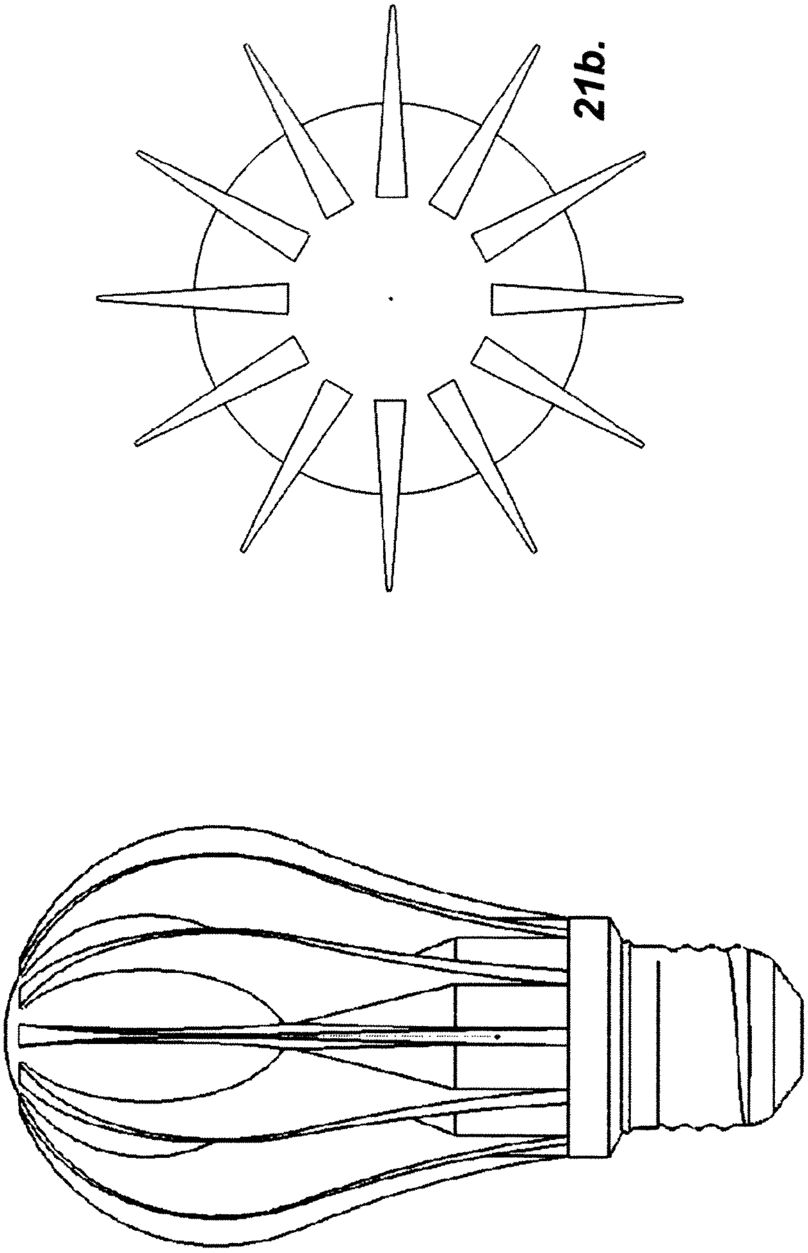
FIG. 21 shows embodiments of thermal heatsink designs employing varying thickness heat fin elements.

FIGS. 21*a-b*. demonstrate a side view and top view of a typical lamp embodiment employing a heat fins with varying thickness along their radial width. Certain manufacturing techniques, such as casting, machining, or injection molding, or others, may be benefited by having draft angles as shown. Since the surface area of planar fins is mainly driven by the radial width of the fin, tapering of the thickness will have minimal impact on thermal dissipation, optical efficiency or light intensity distribution.

Figure 22:
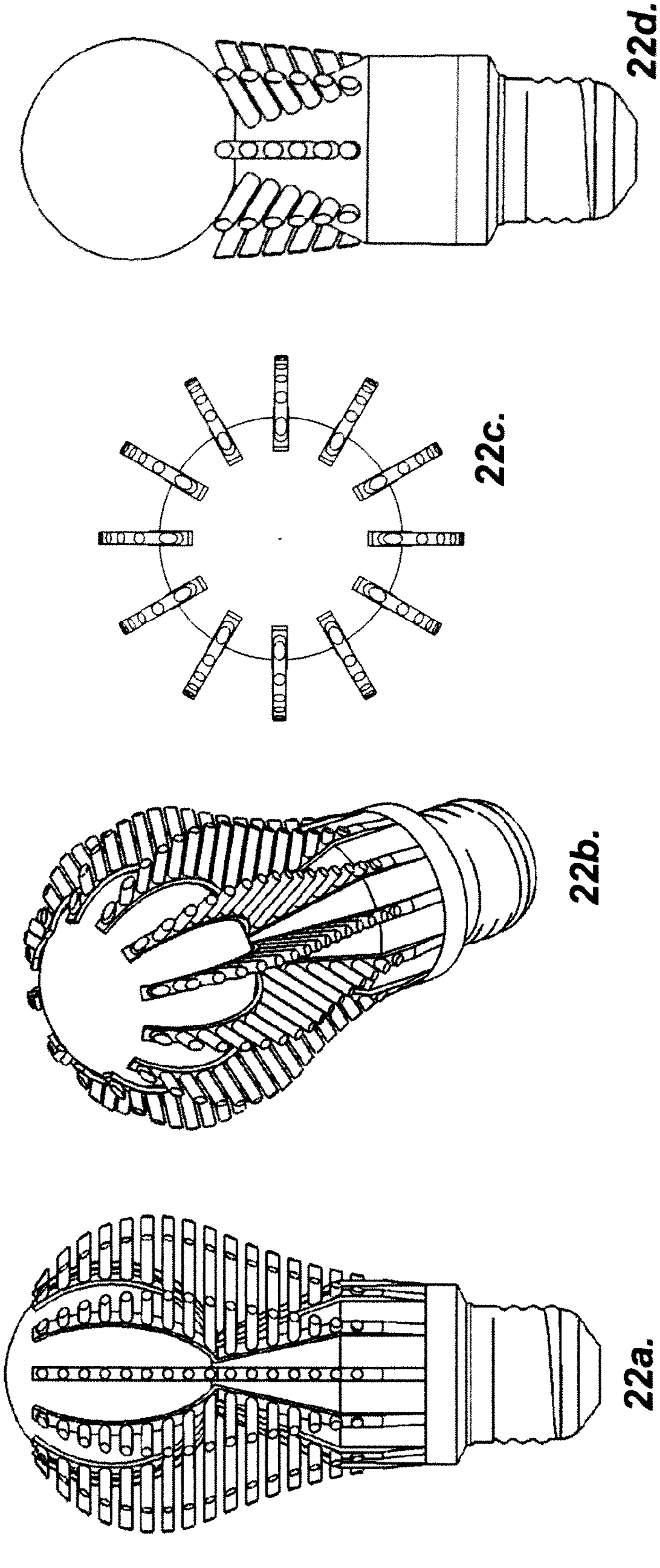
FIG. 22 shows an embodiment of a thermal heatsink design employing surface area enhancing elements in the shape of pins or non-planar fins.

FIG. 22 demonstrates a side and top views of lamp embodiments employing pins and non-planar fins versus a solid fin. The pins allow a greater surface area to occupy the same equivalent volume as a fin, and also aid in convective heat flow through the heat sink fin volume. Similar benefits can be achieved with holes or slots through a solid fin, but such methods can be difficult to manufacture, especially with some metal casting techniques. Similarly, bar-like, oval or structures with more elongated cross-sectional aspect ratios, greater than pins but less than sheets or planar structures would also be useful in this application.

Figure 23:
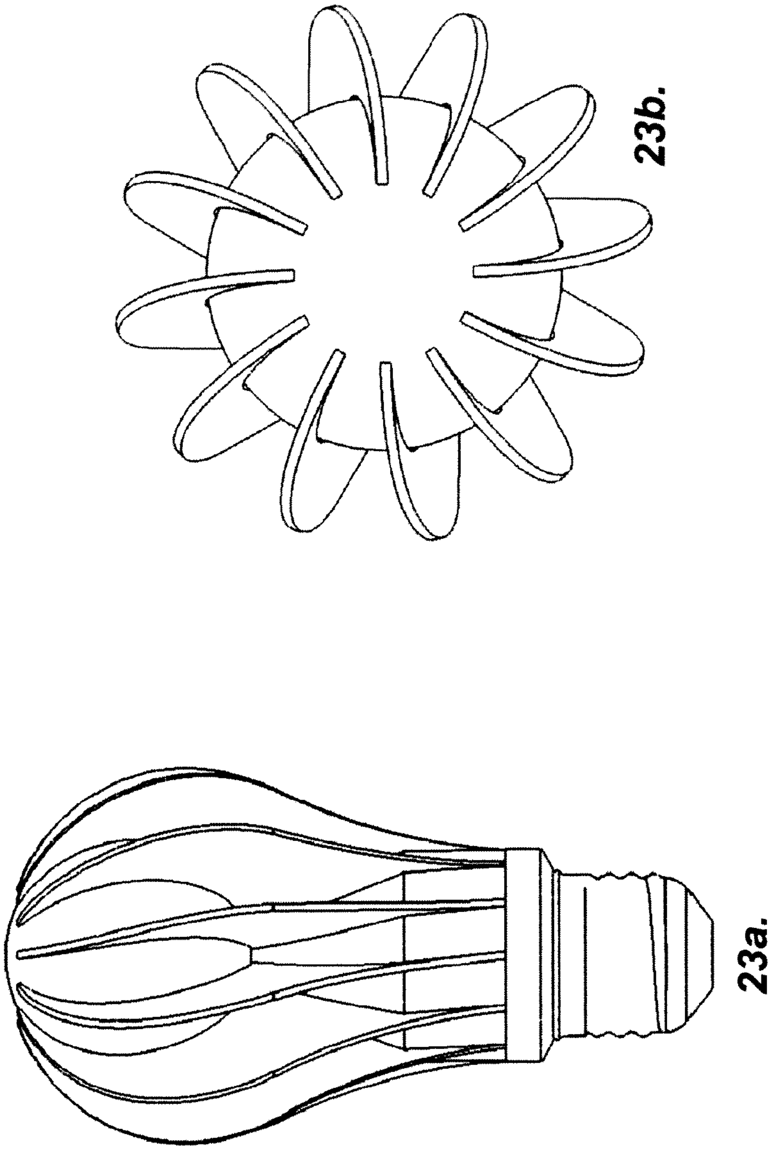
FIG. 23 shows an embodiment of a thermal heatsink design employing non-vertical surface enhancing elements in the shape of planar fins which are adjacent to the light source at and angle or curvature compared to the optical axis.

FIG. 23 demonstrates a side view and top view of a lamp embodiment of thermal heatsink design employing curved fins. Fins can be curved in either direction from the vertical axis. For the same number of fins, curved fins will have increased surface area versus purely vertical fins. The physical dimensions (thickness, width, height) of the curved fins will impact both the latitudinal and longitudinal distributions of light since they will occupy both vertical and horizontal space and not be exclusively planar as with previous embodiments with vertical fins.

Figure 24:
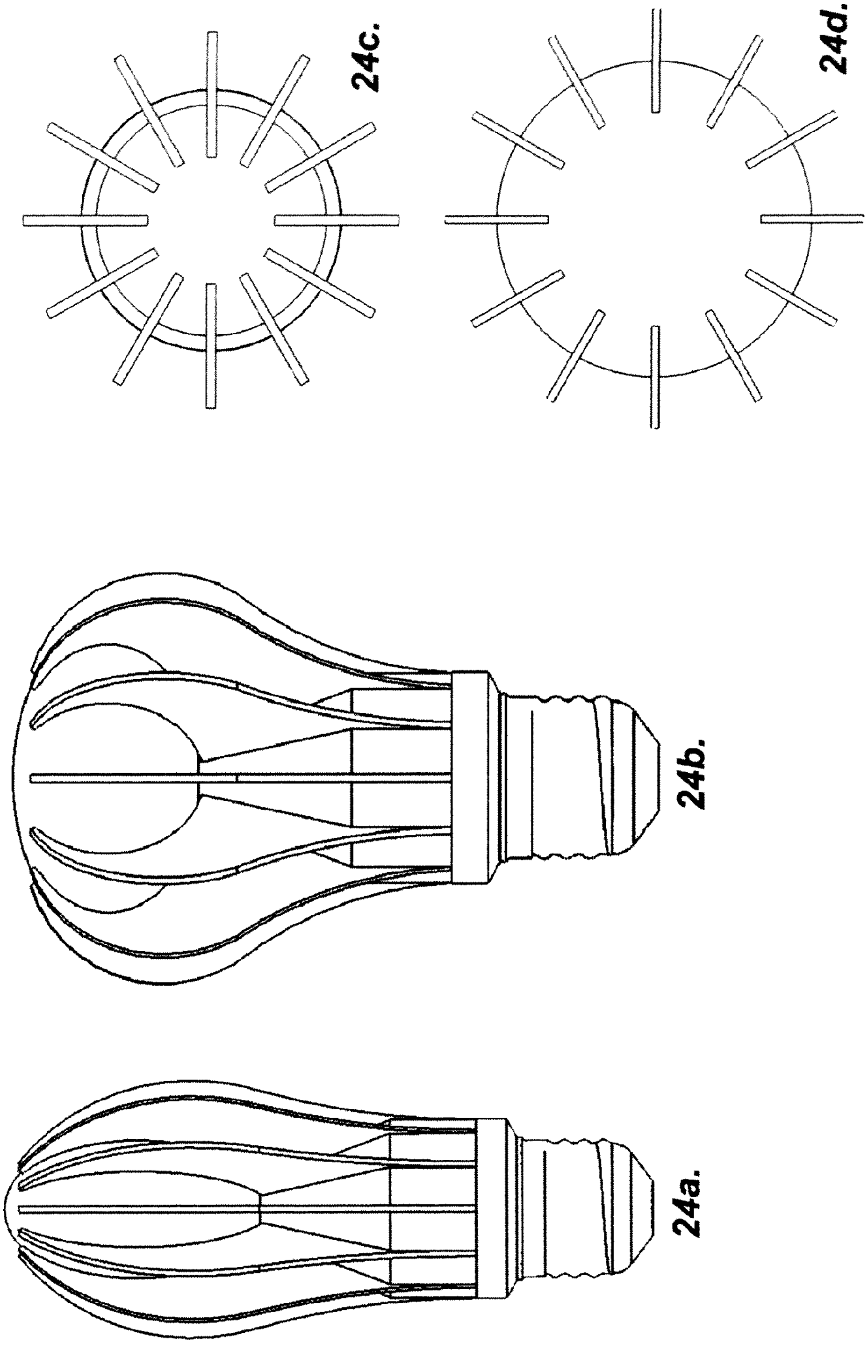
FIG. 24 shows embodiments of thermal heatsink designs around non-spherical envelopes.

FIG. 24 demonstrates both prolate (FIGS. 24*a*. and *c*.) and oblate (FIGS. 24*b*. and *d*.) ellipsoids shaped light-transmissive envelopes surrounded by heat fins. Variations encompassing within and external to this range of non-spherical envelopes are assumed.

Figure 25:
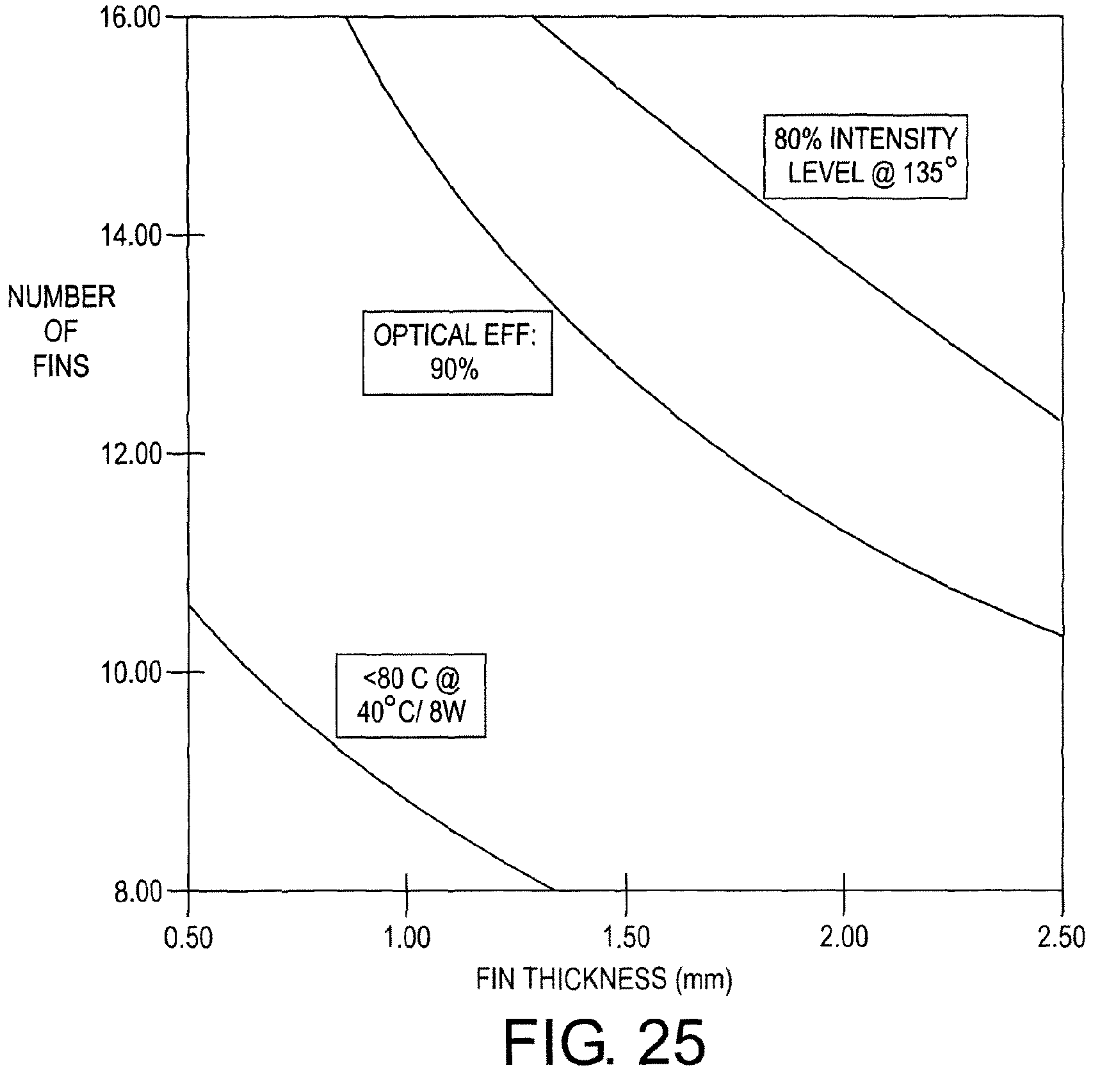
FIG. 25 demonstrates the design space created by optical and thermal constraints for a preferred embodiment.

For most table lamps or decorative bathroom/chandelier lighting ambient temperature is considered to be 25° C., but ambient temperatures of 40° C. and above are possible, especially in enclosed luminaries or in ceiling use. Even with a rise in ambient, the junction temperature ($T_{junction}$) of an LED lamp should be kept below 100° C. for acceptable performance. For all LEDs there is a thermal resistance between the thermal pad temperature ($T_{pad}$) and the $T_{junction}$, usually on the order of 5° C.~15° C. Since ideally the $T_{junction}$ temperature is desired to be less than 100° C., the $T_{pad}$ temperature is desired to be less than 85° C. Referring now to FIG. 25, the LED pad temperature ($T_{pad}$) and optical transmission efficiency for a 10 W LED lamp (8 W dissipated thermal load) are shown for a 40° C. ambient air condition. Also, a substantially uniform light intensity distribution with high optical efficiency (low absorption) is desired. To maintain a high lamp efficiency, it is generally desired that the optical efficiency is maximized for a given design, preferably greater than 80%, more preferably greater than 90%. Light intensity uniformity can be defined as a deviation from the average intensity at some angle adjacent to the south pole, preferably ±20% at 135° for an omnidirectional lamp. The preferred embodiment fin shapes utilized for FIG. 25 are shown in FIGS. 4 and 5. Heat fin thickness is varied from 0.5 mm to 2.5 mm, and the number of heat fins is varied from 8 to 16 and the thermal and optical responses are measured. Heatsink surface reflectivity is maintained at 85%, average for bare aluminum, and the specularity of the surface is maintained at 75%. As fin thickness and number of fins increases, $T_{pad}$ is advantageously decreased, and optical transmission efficiency is disadvantageously decreased. Conversely, as fin thickness and number of fins is decreased, $T_{pad}$ is increased, and optical transmission efficiency is advantageously increased. For this embodiment, the surface area of the truncated cone and cylinder without any fins is ~37 $cm^2$. Each pair of fins as shown in FIG. 4 or 5 adds roughly ~27 to 30 $cm^2$ of fin surface area, while reducing the cone/cylinder surface area by ~1 to 2 $cm^2$ where the fins attach. From a baseline case of no fins whatsoever, to a nominal case of 8 fins with a thickness of 1.5 mm, an enhanced surface area of 4× (~148 $cm^2$ versus ~37 $cm^2$) is provided that provides an increased thermal dissipation capacity and enables a $T_{pad}$ temperature of ~80° C. while maintaining an optical transmission efficiency of greater than 90%. Referring to FIG. 25, a preferred region of operation for this embodiment is bounded by a $T_{pad}$ temperature of <85° C. and an optical transmission efficiency of >90%. This region has an enhanced surface area of at least 2× that provides an increased thermal dissipation capacity of the heat sink. Also shown is a bounding line for the intensity uniformity at 80%. Clearly, for other lamp embodiments different bounds can be set for $T_{pad}$ temperature, optical transmission efficiency, or intensity uniformity based on a specific application that will either restrict or widen the preferred region. Though exact dimensions and physical limits can vary, the tradeoff between thermal design parameters and optical design parameters will compete to define the acceptable design limits.

The preferred embodiments have been illustrated and described. Obviously, modifications, alterations, and combinations will occur to others upon reading and understanding the preceding detailed description. It is intended that the invention be construed as including all such modifications and alterations insofar as they come within the scope of the appended claims or the equivalents thereof.

What is claimed is:

1. A light emitting apparatus comprising a light transmissive envelope; a light emitting diode light source illuminating the interior of the light transmissive envelope; said light source in thermal communication with a base element; and a plurality of fins in thermal communication with said base element such that said fins are communicating optically with light emitted from said light transmissive envelope, and wherein with the exclusion of said fins, the base element comprises light blocking components, the totality of all such light blocking components having a first diameter proximate and external to the light transmissive envelope and a second diameter distal from said envelope, said first diameter being narrower than said second diameter.

2. The lighting apparatus of claim 1 possessing an omnidirectional light intensity distribution.

3. The apparatus of claim 1, wherein said fins possess a surface that is specular, diffuse, or combination thereof.

4. The apparatus of claim 1, where the surface area of said fins is varied as a function of latitude angle to tailor the output light intensity distribution.

5. The apparatus of claim 1, where the quantity of said fins is varied as a function of latitude angle to tailor the output light intensity distribution.

6. The apparatus of claim 1, wherein said fins comprise flat planar fins or flat curved fins, bars, or pins, extending outward from the light source.

7. The apparatus of claim 1, wherein said fins comprise a first narrow width portion adjacent said base element, a second narrow width portion adjacent said envelope and an intermediate relatively wider width portion.

8. The apparatus of claim 1, wherein said envelope is substantially spheroidal.

9. The apparatus of claim 1, wherein said fins are at least about 60% optically reflective.

10. The apparatus of claim 1, wherein said fins are at least about 75% optically reflective.

11. The apparatus of claim 1, wherein said fins are at least about 90% optically reflective.

12. The apparatus of claim 9, wherein said fins have at least an IR emittance of at least 0.5.

13. The apparatus of claim 1, said apparatus having a longitudinal axis dissecting said envelope and said base element and wherein said base element has a light blocking angle of between 0° and 45° as measured from said longitudinal axis at a point of exit from said base.

14. The apparatus of claim 1, wherein said base element includes a base for electrical connection.

15. The apparatus of claim 14 including LED driver electronics encompassed by the base element.

16. The apparatus of claim 1 providing an optical efficiency of at least or about 80%.

17. The apparatus of claim 1 providing an optical efficiency of at least or about 90%.

18. The apparatus of claim 1, wherein the fins increase the thermal dissipation capacity of the thermal heat sink by a factor of at least 2× and absorb less than 20% of emitted light flux.

19. The apparatus of claim 1, wherein the fins increase the thermal dissipation capacity of the thermal heat sink by a factor of at least 3× and absorb less than 15% of emitted light flux.

20. The apparatus of claim 1, wherein the fins increase the thermal dissipation capacity of the thermal heat sink by a factor of at least 4× and absorb less than 10% of emitted light flux.

21. The apparatus of claim 1 having a variation in average light intensity where the unmodified light intensity distribution of the light source is not altered by more than ±30%.

22. The apparatus of claim 1 having a variation in average light intensity between a 0 and 90° viewing angle of less than ±30%.

23. The apparatus of claim 1 having a variation in average light intensity between a 0 and 120° viewing angle of less than ±30%.

24. The apparatus of claim 1 having a variation in average light intensity between a 0 and 135° viewing angle of less than ±20%.

25. The apparatus of claim 6, wherein a said light transmissive envelope outer diameter to fin thickness ratio of greater than 8:1.

26. The apparatus of claim 1, wherein said fins have a first lesser thickness adjacent said envelope and a second greater thickness adjacent said base element.

27. The apparatus of claim 1 wherein said fins include an arcuate outer surface.

28. The apparatus of claim 1 wherein said fins have a specularity in excess of 50%.

29. The apparatus of claim 1 including at least four fins.

30. The apparatus of claim 1 wherein said light transmissive envelope is diffusing.

31. The apparatus of claim 1, wherein said device is dimensioned to meet ANSI C78.20-2003.

32. A lamp comprising a light transmissive envelope; a light emitting diode light source illuminating the interior of the light transmissive envelope; said light source in thermal communication with a base; and a plurality of surface area enhancing elements in thermal communication with said base such that said elements are communicating optically with light emitted from said light transmissive envelope, said apparatus having a longitudinal axis dissecting said envelope and base element and wherein said base has a light blocking angle of between 0° and 45° as measured from said longitudinal axis at a point of exit from said base.

33. The apparatus of claim 13 wherein said light blocking angle extends 360° around a horizontal axis of said device.

34. The apparatus of claim 1 wherein said light blocking components include at least a heat sink, electronics, and an electrical connector.

35. The apparatus of claim 1 wherein said fins extend from said base element to proximate a remote location on said envelope.

* * * * *